(12) United States Patent
Kuramashi et al.

(10) Patent No.: US 10,835,865 B2
(45) Date of Patent: *Nov. 17, 2020

(54) ENGINE EXHAUST DEVICE

(71) Applicant: MAZDA MOTOR CORPORATION, Hiroshima (JP)

(72) Inventors: Taku Kuramashi, Hatsukaichi (JP); Keishi Kitabatake, Hiroshima (JP); Tamotsu Takamure, Hiroshima (JP); Toshiaki Kamo, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/469,899

(22) PCT Filed: Dec. 1, 2017

(86) PCT No.: PCT/JP2017/043297
§ 371 (c)(1),
(2) Date: Jun. 14, 2019

(87) PCT Pub. No.: WO2018/110325
PCT Pub. Date: Jun. 21, 2018

(65) Prior Publication Data
US 2019/0366268 A1 Dec. 5, 2019

(30) Foreign Application Priority Data
Dec. 16, 2016 (JP) .................................. 2016-244419

(51) Int. Cl.
*B01D 53/94* (2006.01)
*F01N 3/021* (2006.01)
(Continued)

(52) U.S. Cl.
CPC ............. *B01D 53/94* (2013.01); *F01N 3/021* (2013.01); *F01N 3/28* (2013.01); *F01N 13/0093* (2014.06); *F01N 13/10* (2013.01); *F01N 2470/18* (2013.01)

(58) Field of Classification Search
None
See application file for complete search history.

(56) References Cited

U.S. PATENT DOCUMENTS

2007/0054409 A1* 3/2007 Inoue ..................... G01N 25/18
436/108
2011/0126521 A1* 6/2011 Ushijima ................ F01N 13/08
60/282
(Continued)

FOREIGN PATENT DOCUMENTS

DE    10 2014 206 907 A1    10/2015
DE    10 2015 107 083 A1    11/2015
(Continued)

OTHER PUBLICATIONS

Sugimoto, K. (JP2011-117409A)-translated document (Year: 2011).*
International Search Report issued in PCT/JP2017/043297; dated Mar. 6, 2018.

*Primary Examiner* — Jelitza M Perez
(74) *Attorney, Agent, or Firm* — Studebaker & Brackett PC

(57) ABSTRACT

An engine exhaust device includes: a first catalyst; a second catalyst; and a tubular connecting member. The connecting member includes: a first opening; a second opening; and a bend connecting. A downstream end surface of the first catalyst is connected to the first opening, and an upstream end surface of the second catalyst is connected to the second opening. The downstream end surface and the upstream end surface form a dihedral angle within a range from 60 to 120 degrees. A part of the upstream end surface of the second catalyst includes an overlap that is close and opposed to a part of a surface of the first catalyst. The bend of the connecting member includes: a first wall; a second wall; and (Continued)

a connector. The first wall has a curve. The curvature radius of the first wall is greater than the predetermined curvature radius.

14 Claims, 15 Drawing Sheets

(51) Int. Cl.
  *F01N 13/00* (2010.01)
  *F01N 3/28* (2006.01)
  *F01N 13/10* (2010.01)

(56) References Cited

U.S. PATENT DOCUMENTS

| | | |
|---|---|---|
| 2012/0198838 A1 | 8/2012 | Bruck et al. |
| 2013/0115145 A1 | 5/2013 | Umemoto et al. |
| 2014/0090364 A1 | 4/2014 | Bruck et al. |
| 2015/0330279 A1 | 11/2015 | Melecosky |

FOREIGN PATENT DOCUMENTS

| | | | |
|---|---|---|---|
| EP | 3075978 A1 | | 10/2016 |
| JP | 2011-117409 A | | 6/2011 |
| JP | 2011117409 A | * | 6/2011 |
| JP | 2012-529592 A | | 11/2012 |
| JP | 2016-125475 A | | 7/2016 |
| JP | 2016-148259 A | | 8/2016 |
| JP | 2016-188599 A | | 11/2016 |
| WO | 2010/142647 A1 | | 12/2010 |
| WO | 2013/069115 A1 | | 5/2013 |

\* cited by examiner

ENGINE EXHAUST DEVICE

TECHNICAL FIELD

The present disclosure relates to an engine exhaust device.

BACKGROUND ART

A plurality of catalysts for purifying exhaust gas from an automobile engine such as a diesel engine or a gasoline engine have been disposed in series in an upstream area of an exhaust passage where the temperature of the exhaust gas is high.

At that time, in order to house the plurality of catalysts within a smaller area, it has been well-known to dispose a catalyst, located in an upstream area in a flow of the exhaust gas, laterally relative to a catalyst located in a downstream area in the flow of the exhaust gas (see Patent Document 1).

Patent Document 1 discloses a technique of disposing, in a housing, first and second exhaust-gas treatment units in directions substantially perpendicular to each other such that the first and second exhaust-gas treatment units overlap by at least 50%.

CITATION LIST

Patent Document

[Patent Document 1] Japanese Unexamined Patent Publication (Japanese Translation of PCT Application) No. 2012-529592

SUMMARY OF THE INVENTION

Technical Problem

However, in the technique in Patent Document 1, when the exhaust gas that has passed through the second exhaust-gas treatment unit flows into the first exhaust-gas treatment unit, it becomes difficult to allow the exhaust gas to flow uniformly in the overlapping area and the rest area of the first exhaust-gas treatment unit. As a result, the first exhaust-gas treatment unit may be used inefficiently. In addition, due to the overlapping area, the exhaust gas may flow unevenly, and the flow rate of the exhaust gas may be increased in some area, resulting in an increase in ventilation resistance and a decrease in output the engine. Further, the overlapping area is so small that the mountability of control devices such as various sensors may decrease in a space between the first and second exhaust gas treatment units.

In view of the foregoing problems, the present disclosure attempts to provide a small-sized, engine exhaust device having a plurality of catalysts, and capable of efficiently using such catalysts to improve function and performance of the catalysts and to improve mountability of a control device.

Solution to the Problem

In order to solve the above problems, the present disclosure is directed to an engine exhaust device, having a plurality of catalysts. The shape of a curve of the inner wall of a connecting member, which connects a first catalyst to a second catalyst, is adjusted. Then, a secondary flow of exhaust gas, which has passed through the first catalyst, is utilized to obtain a uniform flow of exhaust gas into the second catalyst.

An engine exhaust device according to a first aspect of the present disclosure includes: a first catalyst disposed in an exhaust passage of an engine to purify exhaust gas discharged from the engine; a second catalyst disposed downstream of the first catalyst in a direction of a flow of the exhaust gas to purify the exhaust gas that has passed through the first catalyst; and a tubular connecting member forming a part of the exhaust passage, and connecting the first catalyst to the second catalyst. The connecting member includes: a first opening located upstream in the flow of the exhaust gas; a second opening located downstream in the flow of the exhaust gas; and a bend connecting the first opening to the second opening. A downstream end surface of the first catalyst is connected to the first opening. An upstream end surface of the second catalyst is connected to the second opening. The downstream end surface of the first catalyst and the upstream end surface of the second catalyst form a dihedral angle within a range from 60 to 120 degrees. A part of the upstream end surface of the second catalyst includes an overlap that is close and opposed to a part of a surface of the first catalyst. The bend of the connecting member includes: a first wall opposed to the downstream end surface of the first catalyst; a second wall opposed to the upstream end surface of the second catalyst; and a connector connecting the first wall to the second wall with a predetermined curvature radius. The first wall has a curve curving with a curvature radius when the second opening is viewed from a front. The curvature radius of the first wall is greater than the predetermined curvature radius.

It is known that a fluid such as exhaust gas tends to flow along a curve with a great curvature radius. According to the first aspect, the first and second walls are formed so that the curvature radius of the first wall is greater than the predetermined curvature radius of the connector between the first and second walls. This increases the tendency that the exhaust gas, which has passed through the first catalyst, flows more along the surface of the first wall than along the surface of the connector between the first and second walls. Then, the flow of exhaust gas decreases, which has passed through the first catalyst and then directly flows into the second catalyst. On the other hand, an increasing secondary flow of the exhaust gas reaches the first wall, and winds into the space between the first and second catalysts along the curving surface of the first wall from at least one of the top and bottom of the connecting member. Then, the exhaust gas is diffused into the exhaust member. Accordingly, the flow rate of the whole exhaust gas decreases, the amount of flow into the overlap increases. This provides a uniform flow of exhaust gas into the second catalyst. This can eventually provide a small-sized engine exhaust device capable of efficiently using catalysts to improve function and performance of the catalysts and to improve mountability of a control device.

According to a second aspect, in the first aspect, the first catalyst is inserted into the connecting member from the downstream end surface of the first catalyst through the first opening. The second catalyst is inserted into the connecting member from the upstream end surface of the second catalyst through the second opening.

According to the second aspect, the first and second catalysts are inserted into the connecting member. This configuration requires no connecting flange, which is needed if the first and second catalysts are connected to the upstream and downstream ends of the connecting member. This contributes to downsizing of the exhaust device.

According to a third aspect, in the second aspect, a central axis of the first catalyst is located below a plane including a central axis of the second catalyst and parallel to the central axis of the first catalyst. The curve is formed near a bottom of the connecting member.

According to the third aspect, a flow of exhaust gas occurs, which has passed through the first catalyst and winds upward along the surface of the curve of the first wall formed near the bottom of the connecting member. Then, the exhaust gas is diffused into the exhaust member to increase the amount of exhaust gas flowing into the overlap, thereby providing a uniform flow of exhaust gas into the second catalyst.

According to a fourth aspect, in the third aspect, further includes: an exhaust manifold disposed above and close to the first catalyst. The bottom of the connecting member and a bottom of the second catalyst are formed linearly so that a vehicle component is placed below and close to the bottom of the connecting member and the bottom of the second catalyst.

According to the fourth aspect, the exhaust manifold is disposed above the first catalyst, which is provided slightly below the central axis of the second catalyst. This allows for effective downsizing of the exhaust device. In addition, the bottom of the connecting member and the bottom of the second catalyst are formed linearly. This allows for placement of a vehicle component such as a power divider under and close to the connecting member and the second catalyst. Accordingly, a more compact vehicle layout is available.

According to a fifth aspect, in the third or fourth aspect, a base for mounting a detecting means is provided on a top of the connecting member.

The exhaust gas, which has passed through the first catalyst, is diffused into the connecting member, and flows into the second catalyst. At this time, little of the exhaust gas, which has passed through the first catalyst, directly reaches the top of the connecting member. The secondary flow of the exhaust gas, which winds up along the surface of the curve of the first wall, diffuses the exhaust gas. Then, a sufficient amount of exhaust gas to detect, for example, the temperature, component concentration, and pressure of the exhaust gas is diffused at a reduced flow rate near the top of the connecting member. According to the fifth aspect, the base is provided on the top of the connecting member, on which the detecting means is disposed. This configuration achieves stable detection accuracy.

According to a sixth aspect, in one of the first to fifth aspects, the connecting member includes: a first connecting member provided with the first opening and a part of the second opening; and a second connecting member provided with the other part of the second opening. The first wall and the second wall are provided in the second connecting member.

According to the sixth aspect, the connecting member is divided into the first and second connecting members to be molded. This results in accurate molding of the connecting member in a complicated shape. In addition, the first and second walls, which guide the flow of exhaust gas, are formed in the second connecting member. This configuration provides a smooth wall surface without forming any division on the walls, thereby reducing the turbulence of the exhaust gas. Since the part of the second opening close to the first opening is connected from the first opening through the surface of the bend, which sharply bends; the stress tends to concentrate on the surface of the bend. The division between the first and second connecting members is formed away from such a position, in which the stress tends to concentrate. This improves the durability of the connecting member.

Advantages of the Invention

As can be seen from the foregoing description, the present disclosure can provide a small-sized exhaust device capable of efficiently using catalysts to improve function and performance of the catalyst and to improve mountability of a control device.

DESCRIPTION OF EMBODIMENTS

Embodiments of the present disclosure will be described below with reference to the drawings. The following embodiments are merely exemplary ones in nature, and are not intended to limit the scope, applications, or use of the disclosure.

First Embodiment

<Engine>

An engine E to which an exhaust gas purifier 1 (an engine exhaust device) according to a first embodiment is attached is an inline-four cylinder diesel engine mounted in an automobile. The engine E is transversely placed in the front of a front-engine front-drive (FF) vehicle.

The engine to which the exhaust gas purifier 1 according to the first embodiment is attached is not limited to the inline-four cylinder diesel engine, and may be other multi-cylinder engines and a diesel engine. The engine is applicable not only to the FF vehicles, but also to any other vehicle, such as front-engine rear-drive (FR) vehicles, mid-ship-engine rear-drive (MR) vehicles, rear-engine rear-drive (RR) vehicles, four-wheel drive (4WD) vehicles, and motor-cycles, which employ various layouts.

Figure 1:
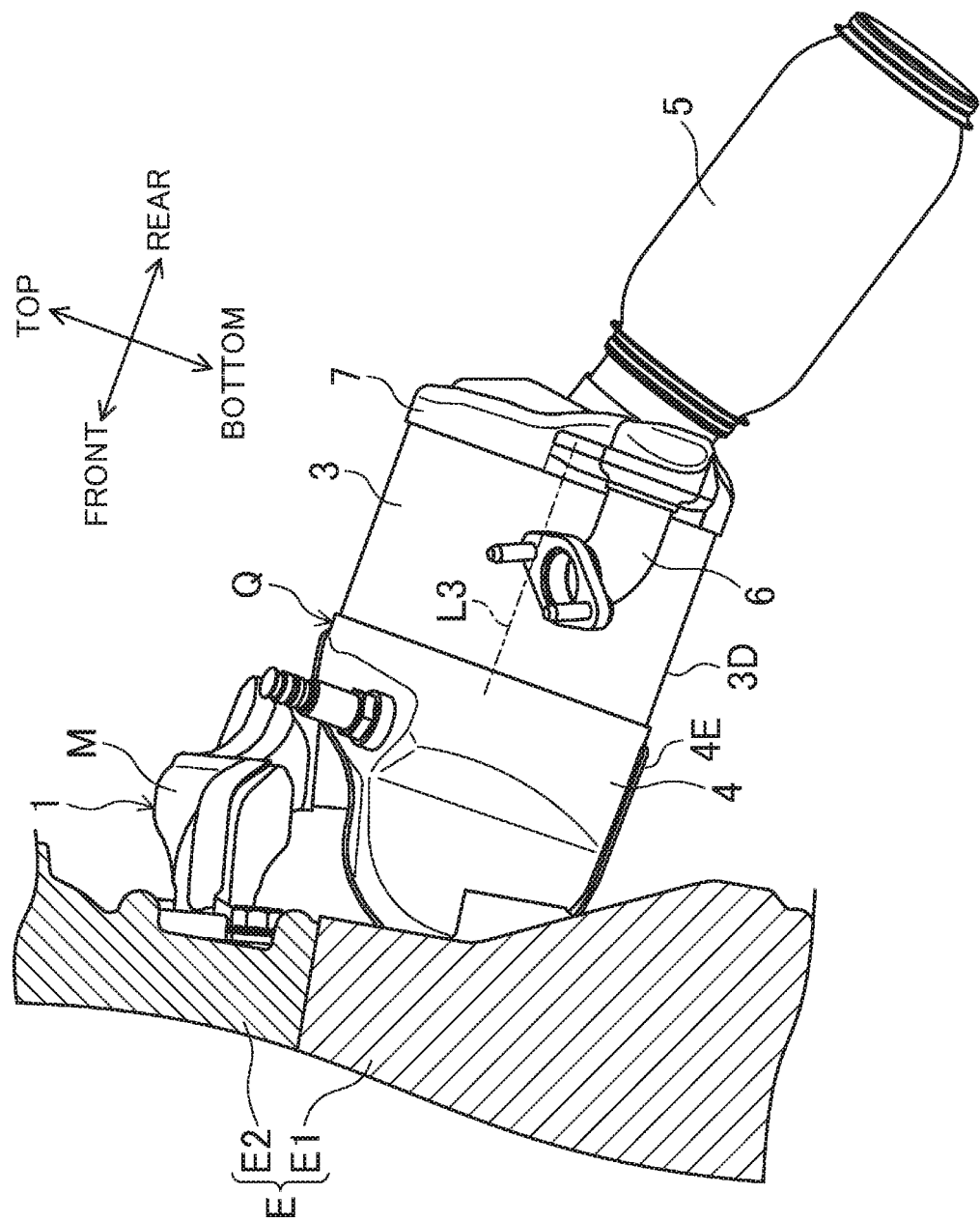
FIG. 1 is a schematic side view of an exhaust gas purifier according to a first embodiment when it is attached to an engine.

As shown in FIG. 1, the engine E includes a cylinder block E1 and a cylinder head E2. Although not shown in detail, first to fourth cylinders, which are defined by the cylinder block E1 and the cylinder head E2, are arranged in this order in series, perpendicular to the paper of FIG. 1. A cylinder bore and piston of the cylinder block E1, and the cylinder head E2 form a combustion chamber for each cylinder.

The cylinder head E2 is provided with four exhaust ports (not shown) connected to the respective four combustion chambers. The exhaust gas generated in the combustion chambers is exhausted to the outside through an exhaust passage including the exhaust ports.

<Exhaust Passage>

Figure 2:
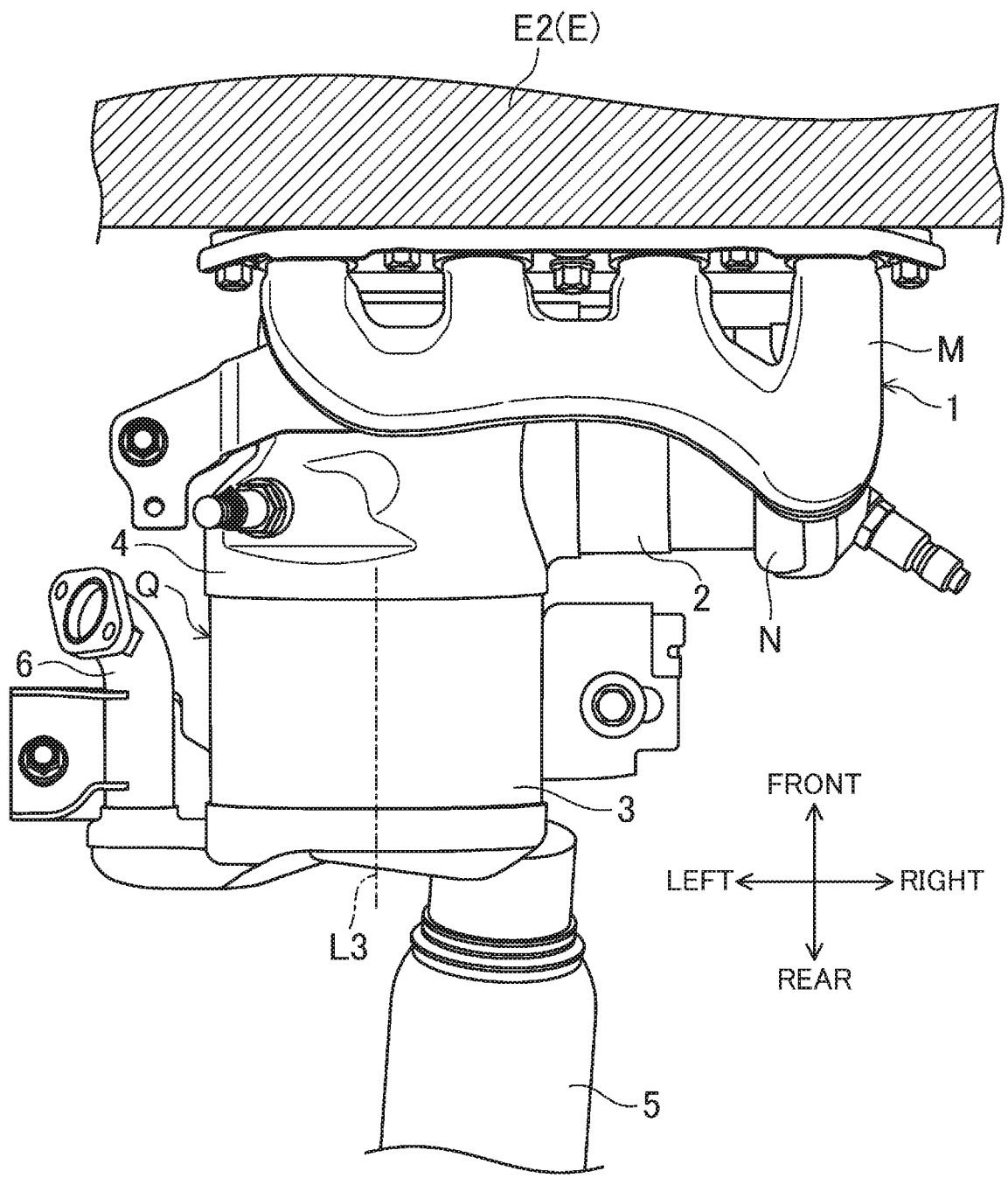
FIG. 2 is a schematic plan view of FIG. 1.

As shown in FIGS. 1 and 2, the exhaust gas purifier 1 of the embodiment is connected to the above-described exhaust ports, and is further connected to, in its downstream side, a downstream exhaust gas passage (not shown) leading to the outside of the vehicle. In this manner, the exhaust passage, to which the exhaust gas purifier 1 is applied, includes the exhaust ports described above, the exhaust gas purifier 1, and the downstream exhaust gas passage.

<Exhaust Gas Purifier>

As shown in FIGS. 1 and 2, the exhaust gas purifier 1 according to this embodiment includes an exhaust manifold M, a connector N, and a catalyst device Q. The exhaust manifold M is connected to the four exhaust ports of the engine E. The connector N is connected to the outlet of the exhaust manifold M. The catalyst device Q is connected to the outlet of the connector N.

<Exhaust Manifold>

As shown in FIGS. 1 and 2, the exhaust manifold M is connected to the four exhaust ports.

As shown in FIG. 2, the exhaust manifold M collects the exhaust gas exhausted from the four combustion chambers through the exhaust ports, and includes separate exhaust pipes connected to the four exhaust ports and collectively disposed on the right of the figure. The exhaust gas that has been collected in the exhaust manifold M is sent to the catalyst device Q through the connector N connected to the outlet of the exhaust manifold M.

<Connector>

The connector N is a tubular member for guiding the exhaust gas, which has been fed from the exhaust manifold M disposed above the catalyst device Q, to the catalyst device Q. In this embodiment, the connector N is an L-shaped tubular member curving from above to the left.

<Directions>

In the description of the present specification, the "vertical direction" and the "longitudinal direction" are used as shown in FIG. 1, with reference to the engine E. In the "vertical direction," the cylinder head E2 is located above, while the cylinder block E1 is located below. In the "longitudinal direction," the engine E is located at the front, while the exhaust manifold M is located at the rear. As shown in FIG. 2, the cylinders are arranged in the "lateral direction," with reference to the engine E. In other words, the "lateral direction" is perpendicular to the drawing plane of FIG. 1. The front is the left side and the rear is the right side. Further, "upstream" and "downstream" are defined based on a direction of the flow of the exhaust gas discharged from the combustion chambers through the respective exhaust ports.

In this embodiment, as shown in FIG. 1, the "longitudinal direction" is parallel to the central axis L3 of a gasoline particulate filter 3 (hereinafter referred to as a "GPF 3"), serving as a second catalyst which will be described later.

<Catalyst Device>

Figure 3:
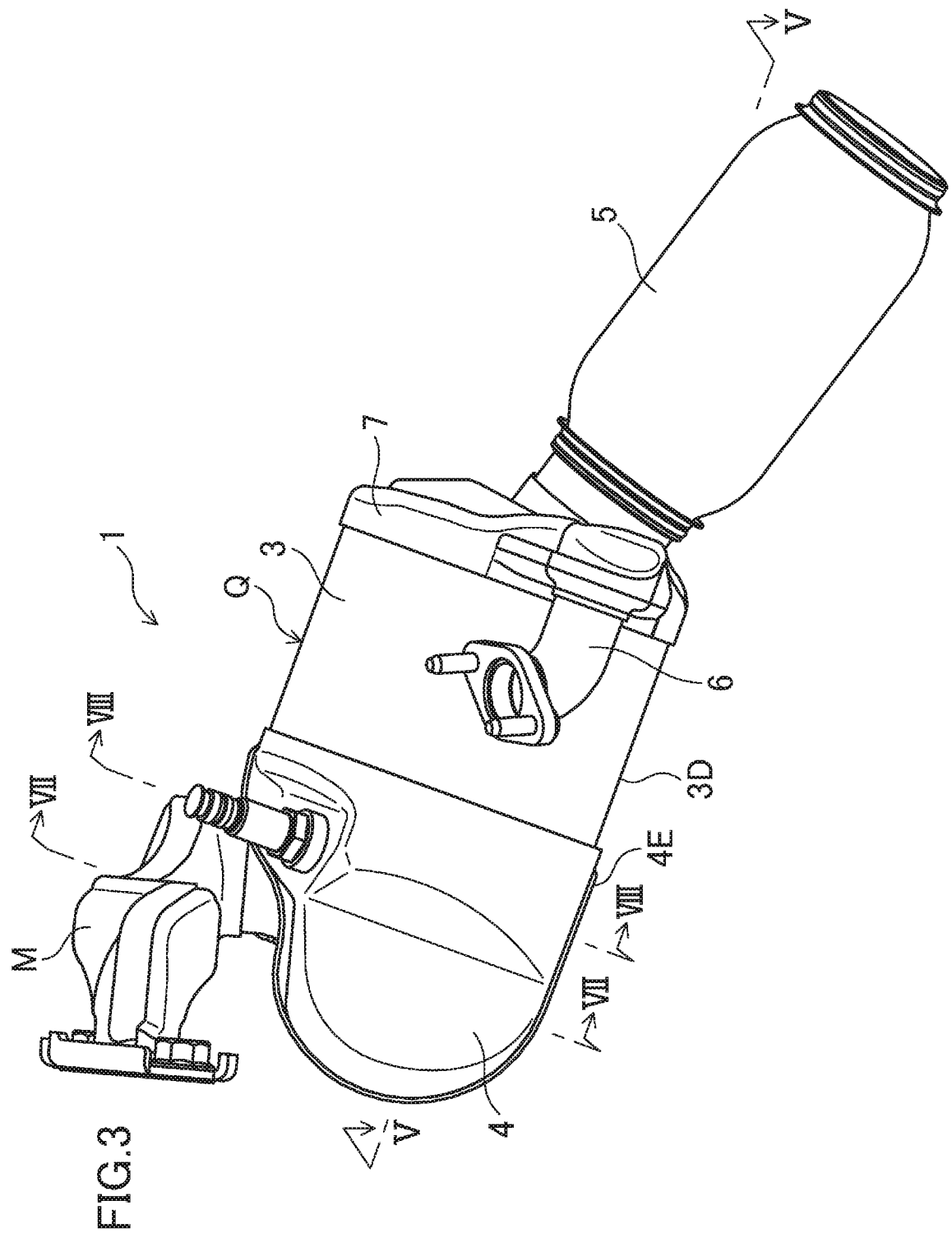
FIG. 3 is a side view of the exhaust gas purifier of FIG. 1.
Figure 4:
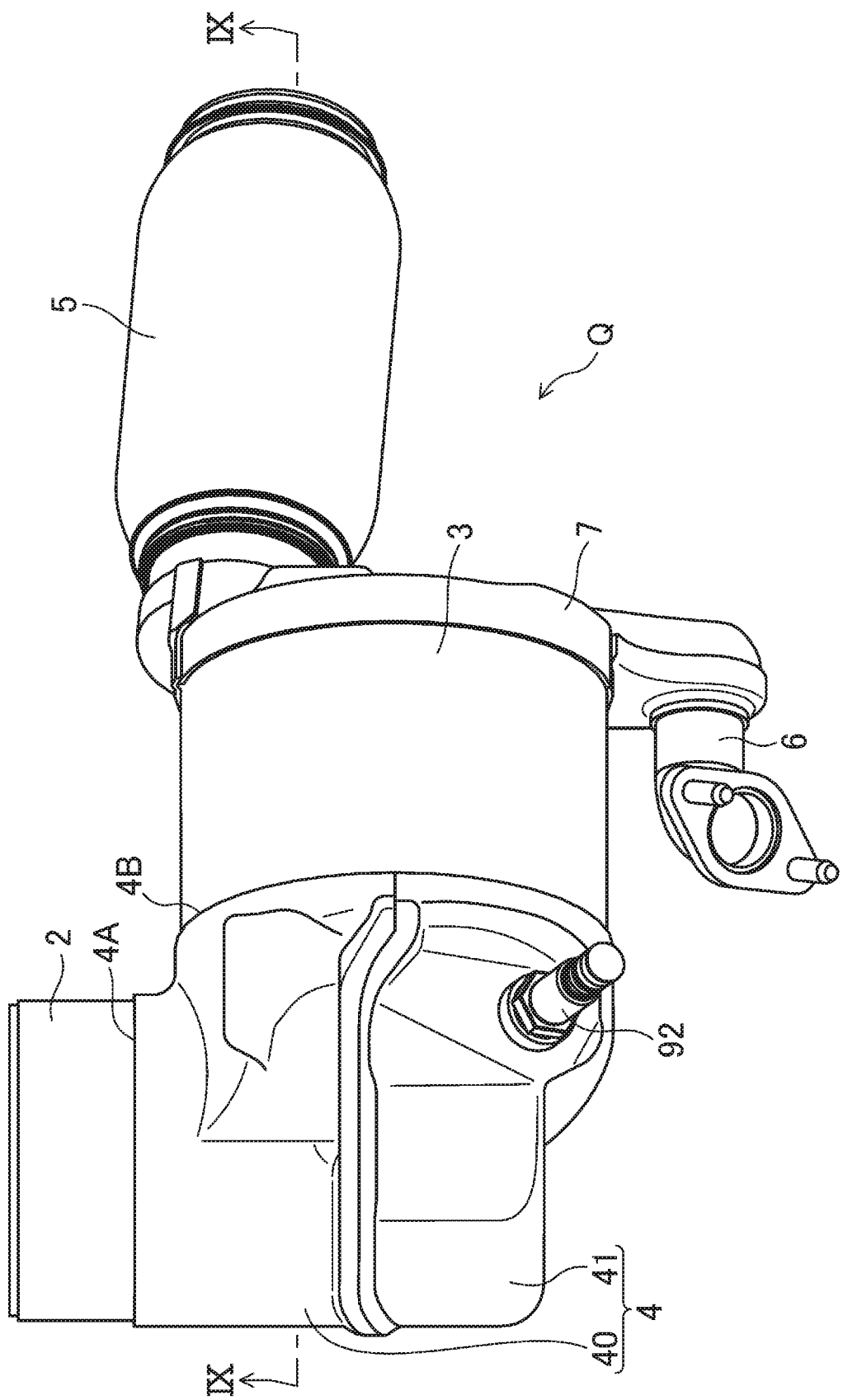
FIG. 4 is a plan view of a catalyst device of the exhaust gas purifier of FIG. 1.

As shown in FIGS. 2 to 4, the catalyst device Q includes a three-way catalyst 2, the GPF 3, a connecting pipe 4, a downstream end part 7 of the GPF, an exhaust gas outlet 5, and an outlet 6 for exhaust gas recirculation (EGR). The three-way catalyst 2 is connected to the outlet of the connector N and serves as a first catalyst. The GPF 3 is disposed downstream of the three-way catalyst 2 and serves as a second catalyst. The connecting pipe 4 connects the three-way catalyst 2 to the GPF 3 and serves as a connecting member. The downstream end part 7 is provided at the downstream end of the GPF 3. The exhaust gas outlet 5 and the outlet 6 for the EGR are provided at the tip of the downstream end part 7 of the GPF.

<Three-Way Catalyst>

The three-way catalyst 2 is a catalyst for purifying hydrocarbon HC, carbon monoxide CO, and nitrogen oxide $NO_x$ in the exhaust gas. Although not described in detail, examples of the three-way catalyst 2 include a catalyst obtained by coating a honeycomb carrier with a catalyst component, which is formed by supporting noble metal such as Pt, Pd, and Rh on a support material of metal oxide. The three-way catalyst 2 is not particularly limited, and may be of any known type.

Figure 5:
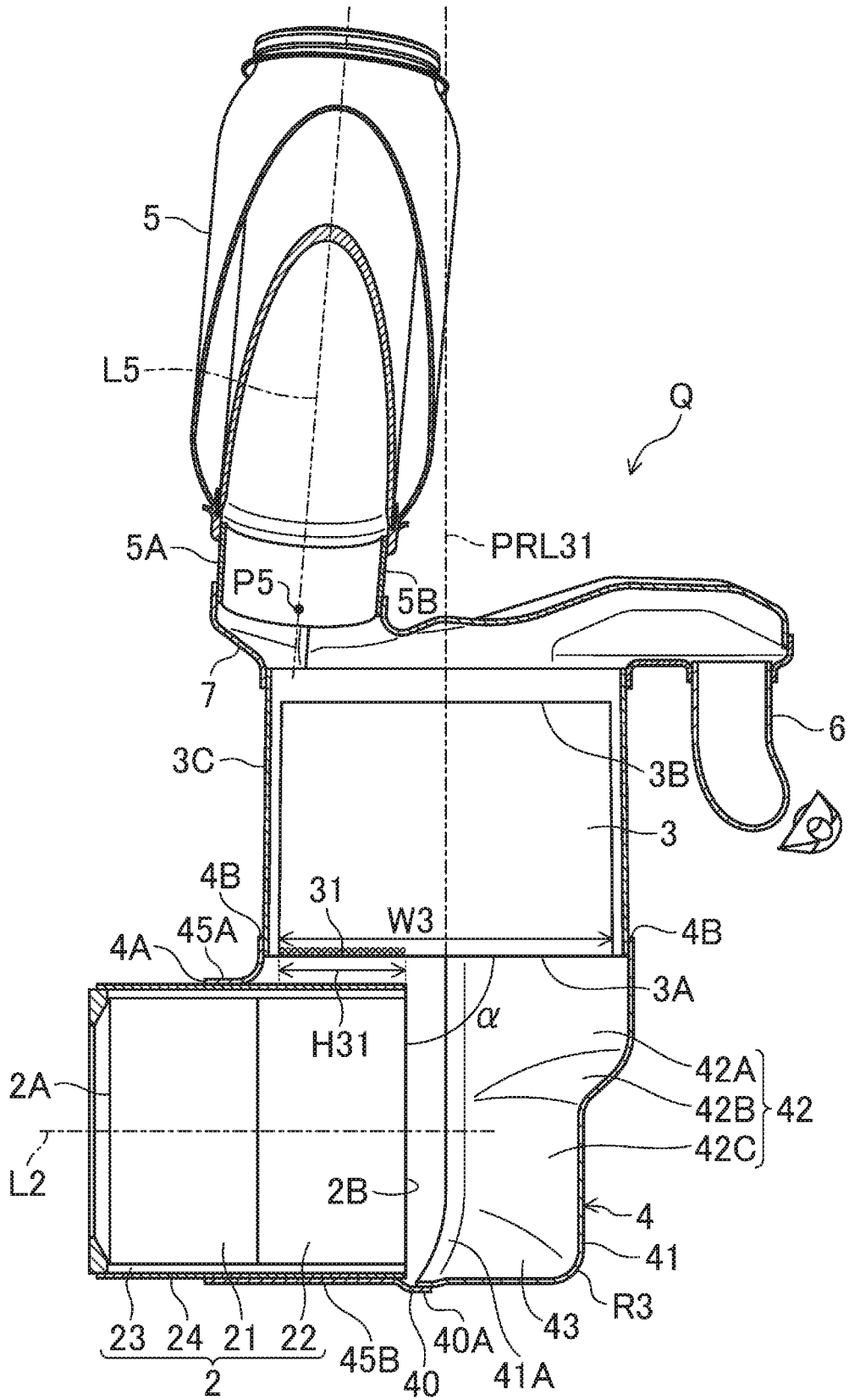
FIG. 5 is a cross-sectional view taken along line V-V of FIG. 3.
Figure 9:
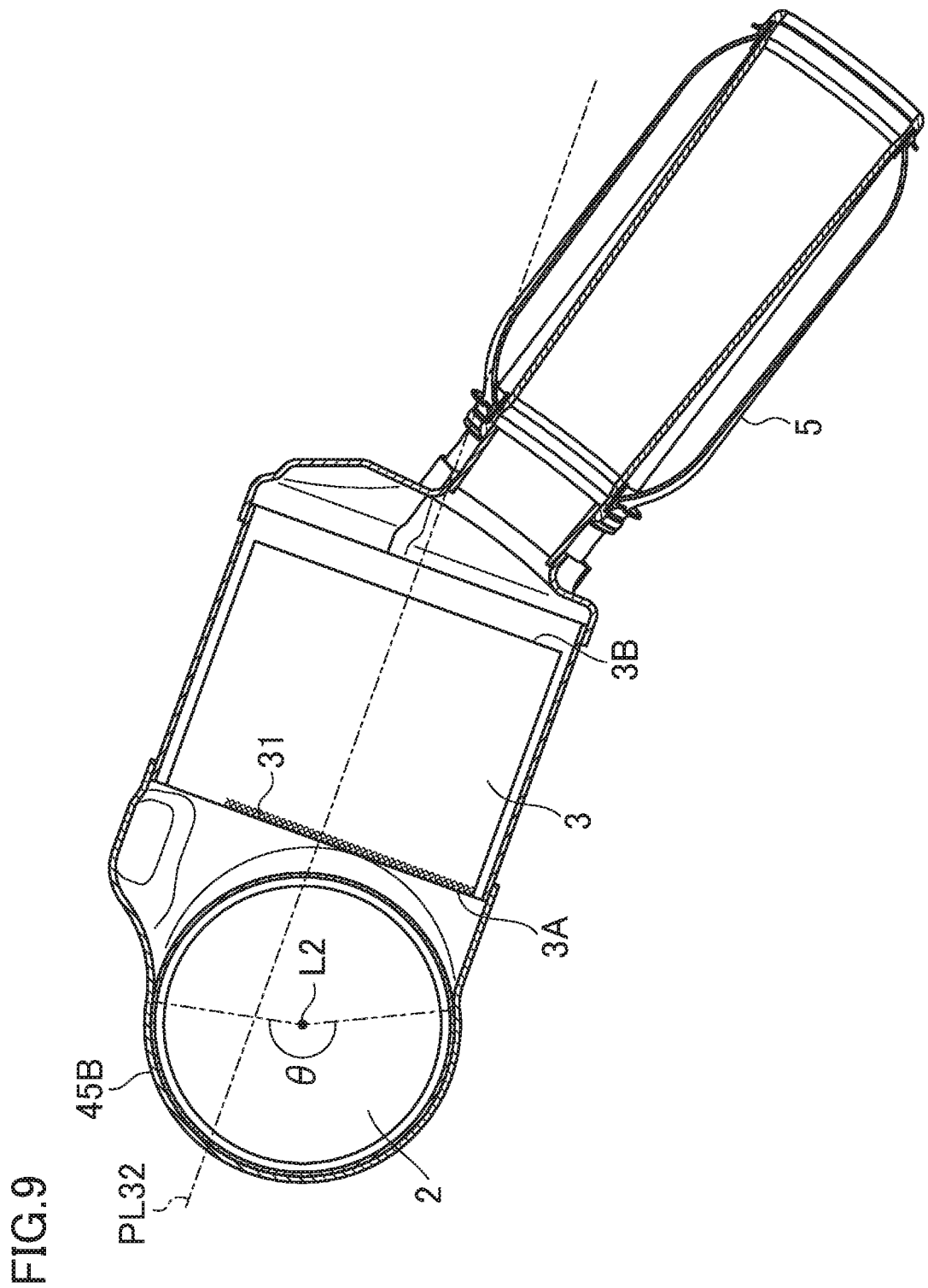
FIG. 9 is a cross-sectional view taken along line IX-IX of FIG. 4.

As shown in FIGS. 5 and 9, the three-way catalyst 2 is a cylindrically-shaped catalyst having a three-way catalyst center axis L2. The shape of the three-way catalyst 2 is not particularly limited, but is a cylindrical member in one preferred embodiment because it can be easily disposed in the exhaust passage and the exhaust gas can flow uniformly in that member. The shape of the cross section perpendicular to the three-way catalyst center axis L2 is not particularly limited, and may be any shape such as a perfect circular shape, an oval shape, a rectangular shape, and a polygonal shape. The cross section may have a perfect circular shape or an oval shape in one preferred embodiment in order to allow the exhaust gas to flow uniformly and reduce manufacturing cost.

Figure 7:
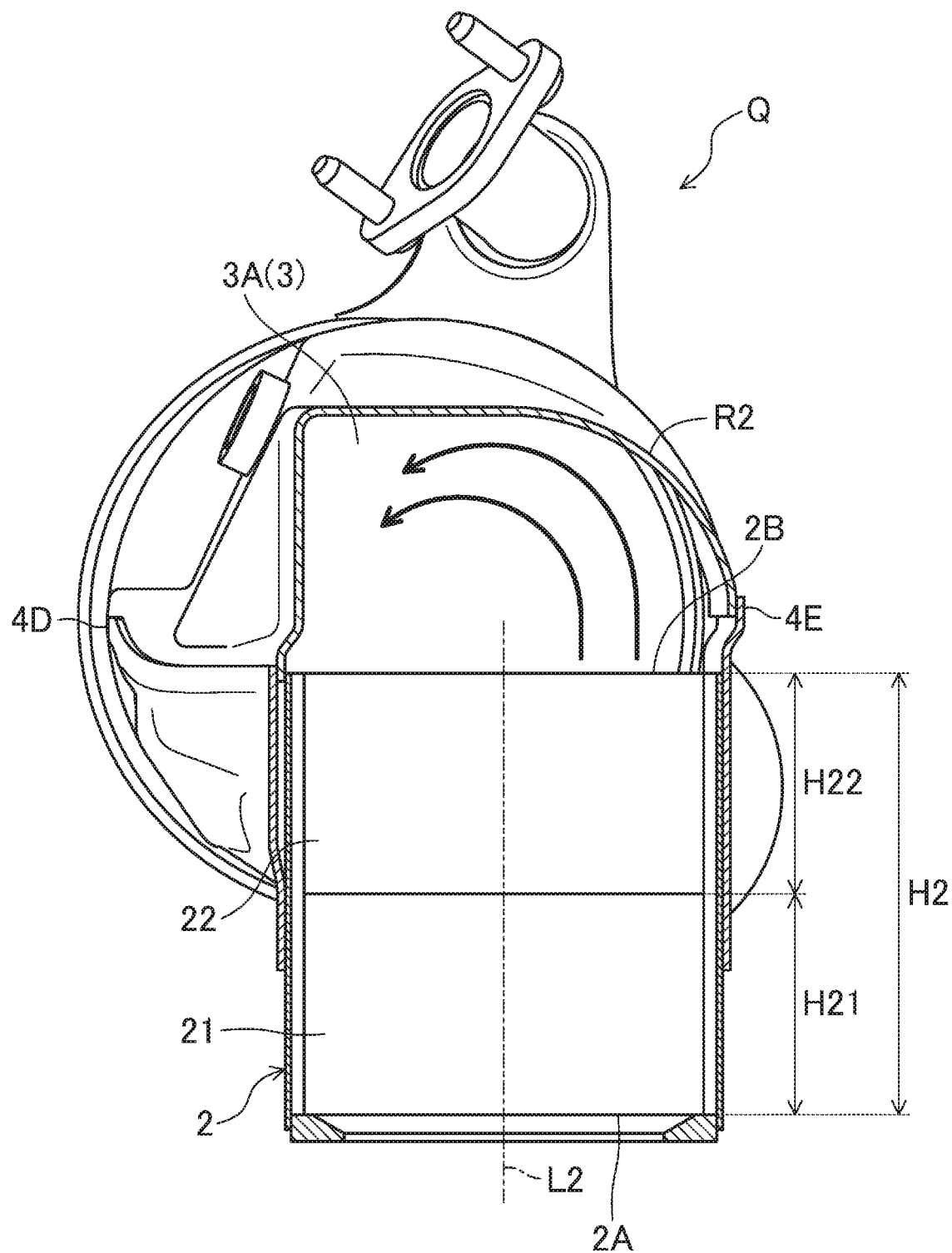
FIG. 7 is a cross-sectional view taken along line VII-VII of FIG. 3.

As shown in FIG. 7, the surface of the three-way catalyst 2 located at the upstream end is referred to an upstream end surface 2A of the three-way catalyst (i.e., the upstream end surface of the first catalyst). The surface of the three-way catalyst 2 located at the downstream end is referred to a downstream end surface 2B of the three-way catalyst (i.e., the downstream end surface of the first catalyst). The upstream and downstream end surfaces 2A and 2B of the three-way catalyst are in a circular shape with the same diameter.

Figure 8:
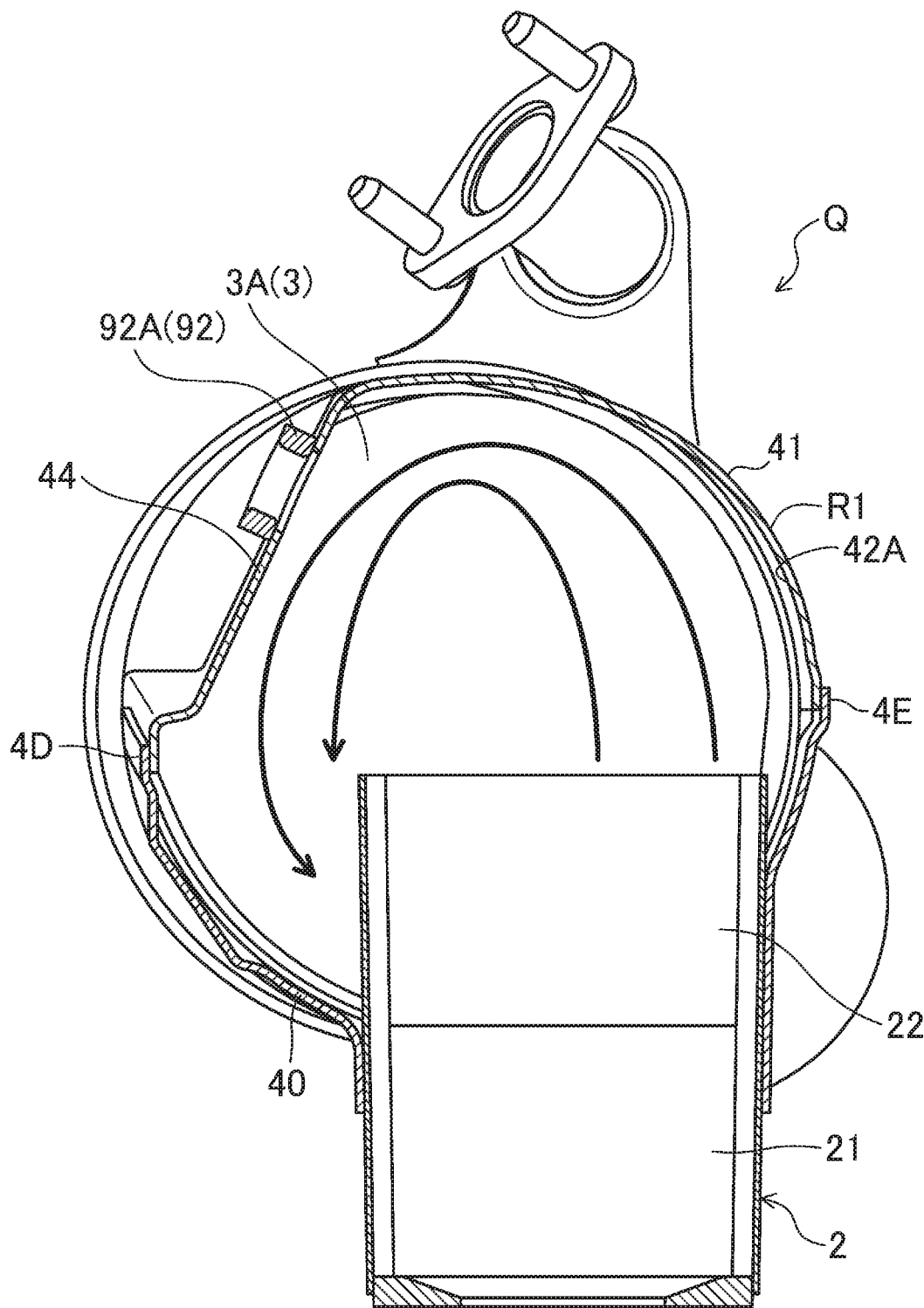
FIG. 8 is a cross-sectional view taken along line VIII-VIII of FIG. 3.

As shown in FIGS. 5, 7, and 8, the three-way catalyst 2 has a two-stage structure as a catalyst body for purifying the exhaust gas. A preceding part 21 is placed closer to the upstream end of the three-way catalyst, while a succeeding part 22 is located closer to the downstream end of the three-way catalyst. The preceding part 21 serves as a three-way catalyst with an excellent low-temperature activity for purifying low-temperature exhaust gas during a low-load operation of the engine E. On the other hand, the succeeding part 22 serves as a three-way catalyst with an excellent high-temperature activity for purifying high-temperature exhaust gas, for example, during a high-load operation. In this embodiment, the three-way catalyst 2 has the two-stage structure of the preceding part 21 and the succeeding part 22, but is not limited thereto. The three-way catalyst 2 may be a single catalyst, or may have a multi-stage structure that is divided into three or more stages.

As shown in FIG. 7, assume that the entire length of the three-way catalyst 2 in the longitudinal direction, that is, parallel to the central axis L2 of the three-way catalyst is H2. Then, the ratio of a length H21 of the preceding part 21 to a length H22 of the succeeding part 22, i.e., H21/H22, is about 1. The ratio of the length H21 of the preceding part 21 to the length H22 of the succeeding part 22, i.e., H21/H22, can be changed according to, e.g., the type of the engine E. However, the ratio falls within a range from 0.50 to 2.0 in one preferred embodiment, and from 0.75 to 1.25 in one more preferred embodiment in order to give the three-way catalyst 2 an excellent catalyst ability.

As shown in FIG. 7, the tip of the three-way catalyst 2 including the upstream end surface 2A, that is, the tip of the preceding part 21 protrudes beyond the connecting pipe 4.

The preceding part 21 is a catalyst which is suitable for purifying low-temperature exhaust gas. Thus, when exposed to high-temperature exhaust gas, the preceding part 21 is more likely to be significantly thermally damaged. Allowing the preceding part 21 to protrude outward from the connecting pipe 4 substantially eliminates the opportunity to expose the preceding part 21 to the high-temperature exhaust gas filling the connecting pipe 4 even in a high-load operation. This can effectively prevent or reduce deterioration of the preceding part 21 due to the heat damage, thereby reducing the risk of the heat damage to the whole three-way catalyst 2.

The preceding part 21 may fully or partially protrude beyond the connecting pipe 4. In addition, the amount of protrusion is adjustable in accordance with the length H21 of the preceding part 21. The amount of protrusion of the preceding part 21 falls within a range from 50% to 100% in one preferred embodiment, from 60% to 95% in one more preferred embodiment, and from 70% to 90% in one particularly preferred embodiment, of the length H21 of the preceding part 21 in order to prevent or reduce the thermal damage of the catalyst with an excellent low-temperature activity.

With the use of a three-way catalyst with an excellent high-temperature activity, the succeeding part 22 may also, or does not have to, protrude beyond the connecting pipe 4. Considering that the succeeding part 22 exhibits excellent performance of purifying high-temperature exhaust gas, the whole succeeding part 22 may be inserted into the connecting pipe 4 in order to downsize the exhaust gas purifier 1.

As shown in FIG. 5, the three-way catalyst 2 includes a catalyst mat 23 and a catalyst case 24. The catalyst mat 23 covers the entire outer peripheries of the preceding and succeeding parts 21 and 22 which serve as a catalyst main body. The catalyst case 24 covers the entire outer periphery of the catalyst mat 23.

The exhaust gas has a low temperature around 400° C. at a low load, and a high temperature around 800° C. at a high load. Then, being always exposed to the high-temperature exhaust gas, which has passed through the three-way catalyst 2, the three-way catalyst 2 may be deteriorated due to thermal damage.

The catalyst mat 23 is for stably holding the preceding part 21 and the succeeding part 22 as the catalyst main body, even under the environment exposed to high-temperature exhaust gas. The catalyst mat 23 is made of a material, such as ceramic, with a high heat resistance and a high heat retention. The thickness of the catalyst mat 23 depends on, for example, the size of the three-way catalyst 2 or the material of the catalyst mat 23, and is not particularly limited. However, the thickness may fall, for example, within a range from 2.0 mm to 8.0 mm, from 3.0 mm to 5.0 mm in one preferred embodiment, and from 3.6 mm to 4.0 mm in one more preferred embodiment, in order to prevent or reduce thermal damage to the three-way catalyst 2. With a thickness smaller than 2.0 mm, the catalyst mat 23 tends to have difficulty in obtaining sufficient holding performance, heat resistance, and heat retention. A thickness larger than 8.0 mm may cause higher manufacturing costs or difficulty in keeping a sufficient space for mounting control devices.

The catalyst case 24 is for holding the preceding part 21 and the succeeding part 22 of the three-way catalyst 2 and the catalyst mat 23, and made of, for example, metal such as iron or stainless steel. Note that the catalyst mat 23 and the catalyst case 24 may be of any known type.

<GPF>

The GPF 3 is a filter disposed downstream of the three-way catalyst 2 to trap particulate matter (hereinafter referred to as "PM") in the exhaust gas, which has passed through the three-way catalyst 2. Although not specifically described, the GPF 3 is, for example, a filter additionally having a filtering function by providing sealing to, e.g., a honeycomb support, and coated with a catalyst to facilitate combustion of the PMs deposited on the filter. The PM in the exhaust gas is adsorbed onto the surface of a partition wall of the GPF 3. Once the PM is deposited, a post injection for injecting a fuel is performed after the main injection to increase the temperature to the temperature for the PM combustion. This allows for incineration of the PM deposited on the GPF 3. The GPF 3 is not particularly limited and may be of any known type.

As shown in FIGS. 1 and 2, the GPF 3 is a cylindrical catalyst with a central axis L3. The shape of the GPF 3 is not particularly limited. However, the GPF 3 is in a cylindrical shape in one preferred embodiment in order to easily dispose the GPF 3 in the exhaust passage and allow the exhaust gas to uniformly flow. The cross-sectional shape of the GPF 3, which is perpendicular to the central axis L3 of the GPF, is not particularly limited. Any shape such as a round, oval, rectangular, or polygonal shape may be employed. However, the GPF 3 may have a round or oval cross-sectional shape in one preferred embodiment in order to allow the exhaust gas to flow uniformly and reduce manufacturing cost.

As shown in FIG. 9, the surface of the GPF 3 located at the upstream end is referred to an upstream end surface 3A of the GPF (i.e., the upstream end surface of the second catalyst). The surface of the GPF 3 located at the downstream end is referred to a downstream end surface 3B of the GPF (i.e., the downstream end surface of the second catalyst). The upstream and downstream end surfaces 3A and 3B of the GPF are in a circular shape with the same diameter.

Just Like the three-way catalyst 2, the GPF 3 includes a catalyst main body of the GPF, a catalyst mat, and a catalyst case. The catalyst main body of the GPF is for purifying the exhaust gas. The catalyst mat of the GPF covers the entire outer periphery of the catalyst main body of the GPF. The catalyst case of the GPF covers the entire outer periphery of the catalyst mat of the GPF. The catalyst mat and the catalyst case of the GPF are used for the same or similar purpose as the catalyst mat 23 and the catalyst case 24 described above, and may have the same or similar configurations as those described above.

<Connecting Pipe>

The connecting pipe 4 is a tubular member for connecting the three-way catalyst 2 to the GPF 3, and forms a part of the exhaust passage.

Figure 10:
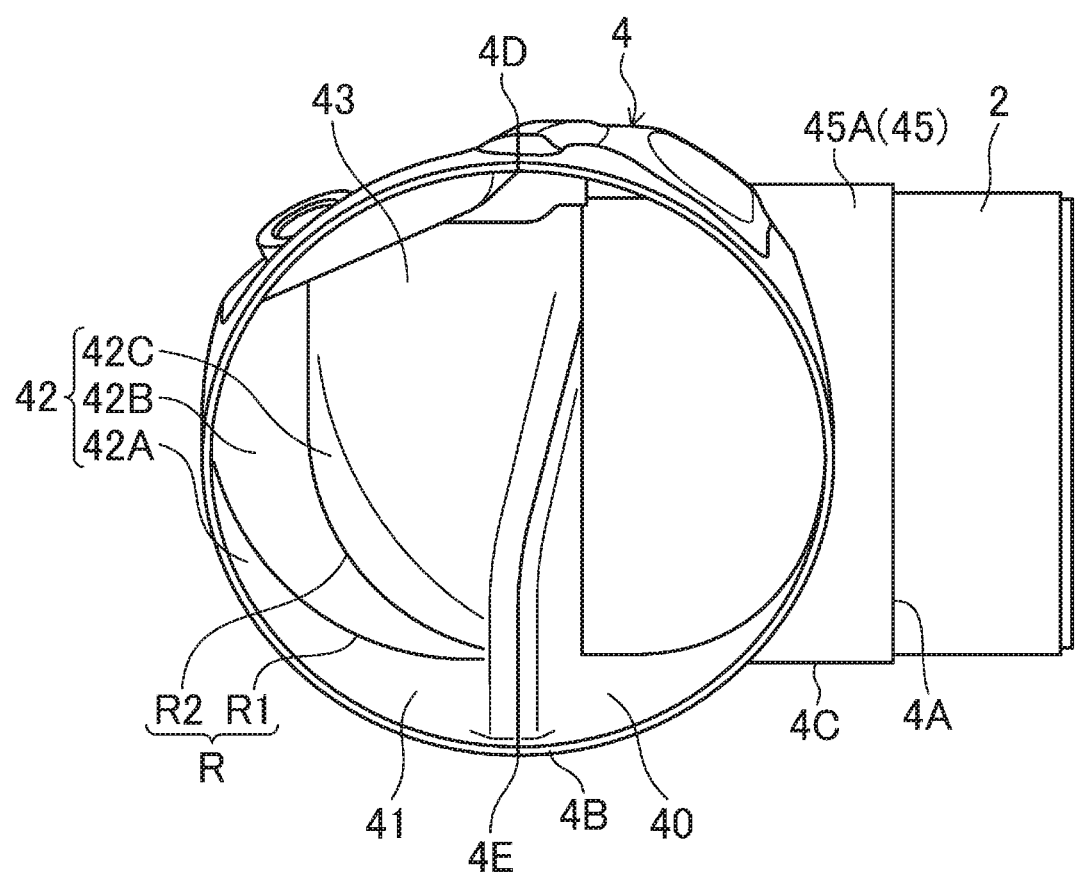
FIG. 10 shows a connecting pipe into which a three-way catalyst is inserted when viewed from a second opening.

As shown in FIG. 10, the connecting pipe 4 includes a first opening 4A at the upstream end, a second opening 4B at the downstream end, and a bend 4C connecting the first opening 4A to the second opening 4B.

As shown in FIG. 10, the downstream end surface 2B of the three-way catalyst 2 is inserted into the connecting pipe 4 through the first opening 4A. On the other hand, for example, as shown in FIG. 5, the upstream end surface 3A of the GPF 3 is inserted into the connecting pipe 4 through the second opening 4B. The configuration, in which the three-way catalyst 2 and the GPF 3 are inserted into the connecting pipe 4, requires, for example, no connecting flange, which is needed if the three-way catalyst 2 and the GPF 3 are connected to the upstream and downstream ends of the connecting pipe 4. This contributes to downsizing of the exhaust gas purifier 1.

—Relative Arrangement Between Three-Way Catalyst and GPF—

FIG. 9 is a cross-sectional view taken along line IX-IX of FIG. 4. The cross-section, which is perpendicular to the central axis L2 of the three-way catalyst 2 and passes through the GPF 3 and the exhaust gas outlet 5, is viewed from the left. The cross-section of FIG. 9 is hereinafter referred to as a "IX-IX cross section (vertical cross section)." The line denoted by a reference character PL32 in FIG. 9 represents a plane that includes the central axis L3 of the GPF 3 and is parallel to the central axis L2 of the three-way catalyst 2.

As shown in FIG. 9, the central axis L2 of the three-way catalyst 2 is located below the plane PL32, that is, the central axis L3 of the GPF 3 on the IX-IX section. Accordingly, as will be described later, the exhaust manifold M can be disposed above the three-way catalyst 2 so that the exhaust gas purifier 1 can be disposed in a small area in the vehicle.

As shown in FIG. 5, the downstream end surface 2B of the three-way catalyst 2 and the upstream end surface 3A of the GPF 3 are arranged in the bend 4C to form a dihedral angle α of about 90 degrees. The dihedral angle α is not limited to this angle. However, the angle falls within a range from 60° to 120° in one preferred embodiment, from 70° to 110° in one more preferred embodiment, and from 80° to 100° in one particularly preferred embodiment in order to maintain a sufficient flow of exhaust gas from the three-way catalyst 2 to the GPF 3.

In addition, a part of the upstream end surface 3A of the GPF 3 is covered with a side surface of the three-way catalyst 2 to form an overlap 31. In other words, the overlap 31 is a part of the upstream end surface 3A of the GPF 3, which is close and opposed to a part of the side surface of the three-way catalyst 2.

FIG. 5 is a cross-sectional view taken along line V-V in FIG. 3. The cross-section, which includes the central axis L2 of the three-way catalyst 2 and is parallel to the central axis L3 of the GPF 3, is viewed from above. The cross section shown in FIG. 5 is hereinafter referred to as a "V-V section" (cross-section). As shown in FIG. 5, the length H31 of the side surface of the three-way catalyst 2 forming the overlap 31 is 10% or longer and shorter than 50% of the entire length H2 of the three-way catalyst 2 on the V-V section in one preferred embodiment in order to allow the exhaust gas to flow uniformly in the GPF 3 while disposing the three-way catalyst 2 and the GPF 3 within a smaller area.

The length H31 of the side surface of the three-way catalyst 2 is 10% or longer and shorter than 50% of the width W3 of the GPF in one preferred embodiment in order to allow the exhaust gas to flow uniformly in the GPF 3 while disposing the three-way catalyst 2 and the GPF 3 within a smaller area.

In this way, when the three-way catalyst 2 and the GPF 3 are laterally disposed, the overlap 31 where the first catalyst and the GPF 3 overlap each other is formed while keeping an overlapping length less than the above range, thereby reducing the size of the exhaust gas purifier 1, and using the GPF 3, in particular, the overlap 31 more efficiently.

—First and Second Connecting Members—

Figure 12:
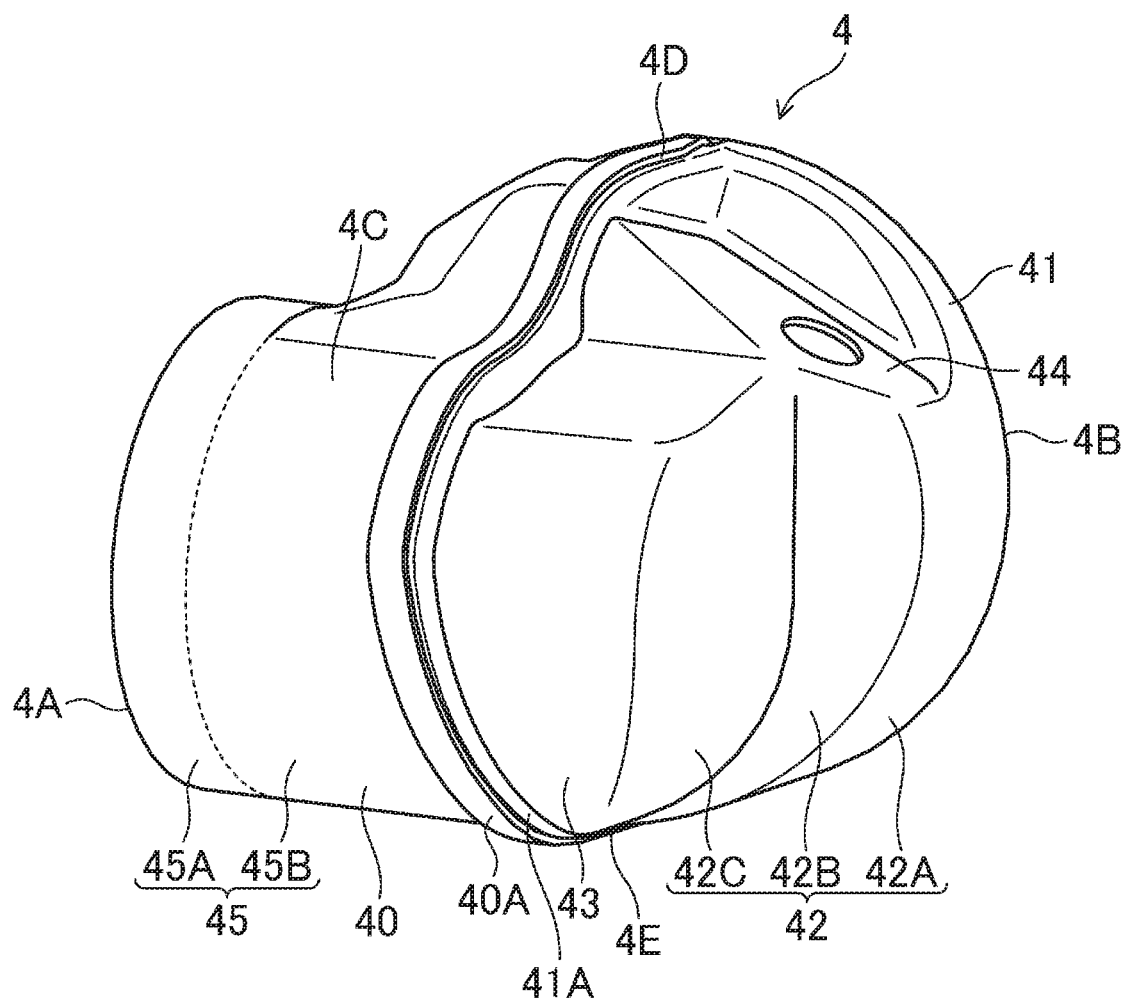
FIG. 12 is a perspective view of the connecting pipe when viewed from upper left front.

As shown in FIGS. 10 and 12, the connecting pipe 4 includes a first connecting member 40 and a second connecting member 41.

As shown in FIG. 12, the first and second connecting members 40 and 41 are respectively provided with a first joint 40A and a second joint 41A in the connecting pipe 4 near the downstream end surface 2B of the three-way catalyst 2. The first and second joints 40A and 41A are fitted to each other to form the connecting pipe 4.

As shown in FIG. 10, the first connecting member 40 is provided with the first opening 4A and a part, namely, the right half, of the second opening 4B. On the other hand, the second connecting member 41 is provided with the other part, namely, the rest left half of the second opening 4B.

In other words, the connecting pipe 4 is comprised of the two members, namely, the first connecting member 40 and the second connecting member 41. The first connecting member 40 includes the first opening 4A, the part of the second opening 4B, and a part of the bend 4C. The second connecting member 41 includes the rest of the second opening 4B and the rest of the bend 4C.

Using the separate members, namely, the first connecting member 40 and the second connecting member 41 allows for precisely forming the connecting pipe 4 with a complicated shape. The part, of the second opening 4B, closer to the first opening 4A is connected to the first opening 4A through the wall surface of the bend 4C bending with a small curvature radius. Thus, the stress tends to concentrate on the wall surface of the bend. The first connecting member 40 and the second connecting member 41 are joined together at a position expect such a position where the stress tends to be concentrated, thereby ensuring durability of the connecting pipe 4.

In the specification, as shown in FIG. 10, the uppermost part and the lowermost part of the connecting pipe 4 are referred to as a top 4D and a bottom 4E, respectively, where the exhaust gas purifier 1 including the connecting pipe 4 is assembled into the engine E. Note that, in this embodiment, the top 4D and the bottom 4E are located near the joint between the first and second connecting members 40 and 41.

—Support—

As shown in FIGS. 10 and 12, the first connecting member 40 includes a support 45 for supporting the outer peripheral surface of the three-way catalyst 2.

As shown in FIGS. 5, 9, 10, 11, and 12, the support 45 includes a support 45A adjacent to the first opening 4A and a support (support surface) 45B adjacent to the downstream end surface 2B of the three-way catalyst 2. The support 45A extends from the first opening 4A toward the downstream end face 2B of the three-way catalyst 2, and supports the entire outer peripheral surface of the three-way catalyst 2. The support 45B extends from the support 45A, and supports a part of the outer peripheral surface of the three-way catalyst 2, which is located opposite to the GPF 3 with respect to the three-way catalyst 2. In FIG. 12, the boundary between the support 45A and the support 45B is indicated by a dotted line for the sake of explanation.

As shown in FIG. 9, the three-way catalyst 2 is viewed from the left, that is, from the downstream end surface 2B of the three-way catalyst. At this time, the support 45B adjacent to the downstream end surface of the three-way catalyst supports part of the outer peripheral surface of the three-way catalyst 2 in a range of an angle θ of about 190° around the three-way catalyst center axis L2 of the three-way catalyst 2. The angle θ is not limited to this angle. However, the angle θ is 180 degrees or greater in one preferred embodiment in order to downsize the exhaust gas purifier 1, improve the performance of the connecting pipe 4 in holding the three-way catalyst 2, and reduce the thermal damage to the three-way catalyst 2.

The outer peripheral surface of the three-way catalyst 2 is supported by the support 45B, which is formed in this manner in the connecting pipe 4 and has a sufficient area. This improves the supportability of the three-way catalyst 2, and further reduces the longitudinal size of the catalyst device Q.

The support 45B adjacent to the downstream end surface of the three-way catalyst supports the three-way catalyst 2. This does not allow the exhaust gas, which has passed through the three-way catalyst 2, to come into contact with the outer peripheral surface, which is supported by the support 45B adjacent to the downstream end surface of the three-way catalyst. This reduces the volume of the part of the three-way catalyst 2 exposed to the exhaust gas, which has passed through the three-way catalyst 2 itself, thereby reducing thermal damage due to constant exposure to the high-temperature exhaust gas. In particular, the entire outer periphery of the three-way catalyst 2 is covered with the catalyst mat 23 and the catalyst case 24 as described above. This reduces thermal expansion of the catalyst case 24, which is caused by the thermal damage, and eventually, reduces a decrease in a contact pressure on the catalyst mat 23. Such a configuration also prevents or reduces wind erosion of the catalyst mat 23 due to the thermal damage, and displacement of the main body of the three-way catalyst 2 from the catalyst mat 23 and the catalyst case 24 when the main body is held.

As shown in FIG. 1, the outer peripheral surface supported by the support 45B adjacent to the downstream end surface of the three-way catalyst is adjacent to the cylinder block E1 of the engine E. In this configuration, the exhaust gas, which has passed through the three-way catalyst 2, does not flow into the cylinder block E1. This reduces a heat damage to the outside of the catalyst device Q.

—First and Second Walls—

As shown in FIGS. 5, 6, 10, and 12, the second connecting member 41 includes a first wall 42 and a second wall 43 for guiding the exhaust gas, which has passed through the three-way catalyst 2, to the GPF 3. As shown in FIG. 5, the first wall 42 faces the downstream end surface 2B of the three-way catalyst 2. The second wall 43 faces the upstream end surface 3A of the GPF 3.

The first wall 42 and the second wall 43 are formed in only the second connecting member 41 when the separate members, namely, the first connecting member 40 and the second connecting member 41 are used to form the connecting pipe 4, thereby providing a smooth wall surface to the walls guiding the exhaust gas without forming a separated position. This can reduce turbulence of the flow of the exhaust gas.

As shown in FIGS. 10 and 12, the first wall 42 includes a wall transition 42A, a wall slope 42B, and a wall step 42C. The wall transition 42A extends smoothly forward from the downstream end, which forms the second opening 4B. The wall slope 42B is smoothly connected to the wall transition 42A, and extends toward the three-way catalyst 2. The rear of the wall step 42C is smoothly connected to the wall slope 42B. The front is smoothly connected to the second wall 43 with a curvature radius R3 (a predetermined curvature radius), as shown in FIG. 5.

As shown in FIG. 10, the wall transition 42A includes a wall transition curve (or simply a curve). When the second opening 4B is viewed from the front, that is, when the connecting pipe 4 is viewed from the second opening 4B so that the first opening 4A is placed on the right, the wall transition curve curves with a curvature radius R1 toward the bottom 4E of the connecting pipe 4. Likewise, the wall step 42C includes a wall step curve (or simply a curve), which curves with a curvature radius R2 toward the bottom 4E of the connecting pipe 4. Note that, as shown in FIG. 10, the curvature radius R1 of the wall transition and the curvature radius R2 of the wall step are collectively referred to as the curvature radius R of the first wall.

The curvature radius R of the first wall shown in FIG. 10 is here set to be greater than the curvature radius R3 of the second wall shown in FIG. 5.

Figure 15:
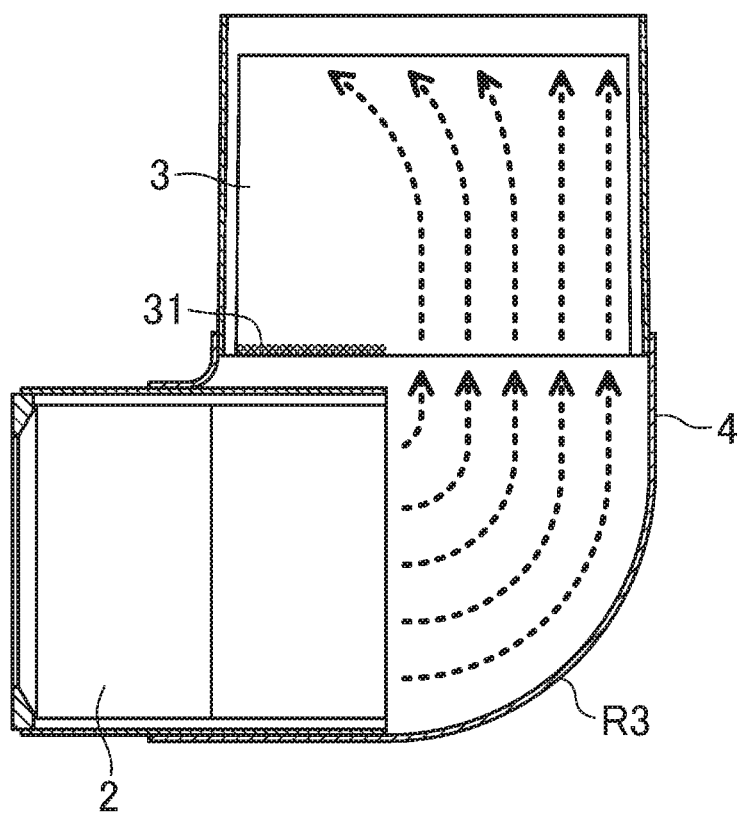
FIG. 15 schematically shows the flow of the exhaust gas when a bend of the connecting pipe in a situation where the three-way catalyst and the GPF are disposed in FIG. 6 has a larger second wall curvature radius.

It is known that a fluid such as exhaust gas tends to flow along a curved surface with a great curvature radius. For example, as shown in FIG. 15, suppose that the bend 4C of the connecting pipe 4 employs a general curved tubular shape, and specifically, the curvature radius R3 of the second wall curves larger and more gently than the curvature radius R of the first wall. In this case, as indicated by the broken arrow in FIG. 15, it is considered that most of the exhaust gas, which has passed through the three-way catalyst 2, directly flows into the GPF 3 along the wall surface, which gently curves with the curvature radius R3 of the second wall. Then, a decreasing amount of exhaust gas flows into the vicinity of the overlap 31 of the GPF 3, which may reduce the efficiency in using the GPF 3. Also, in the area where the increasing amount of the exhaust gas flows, the exhaust gas flows quickly, and thus, ventilation resistance may be increased and power may be decreased.

Figure 6:
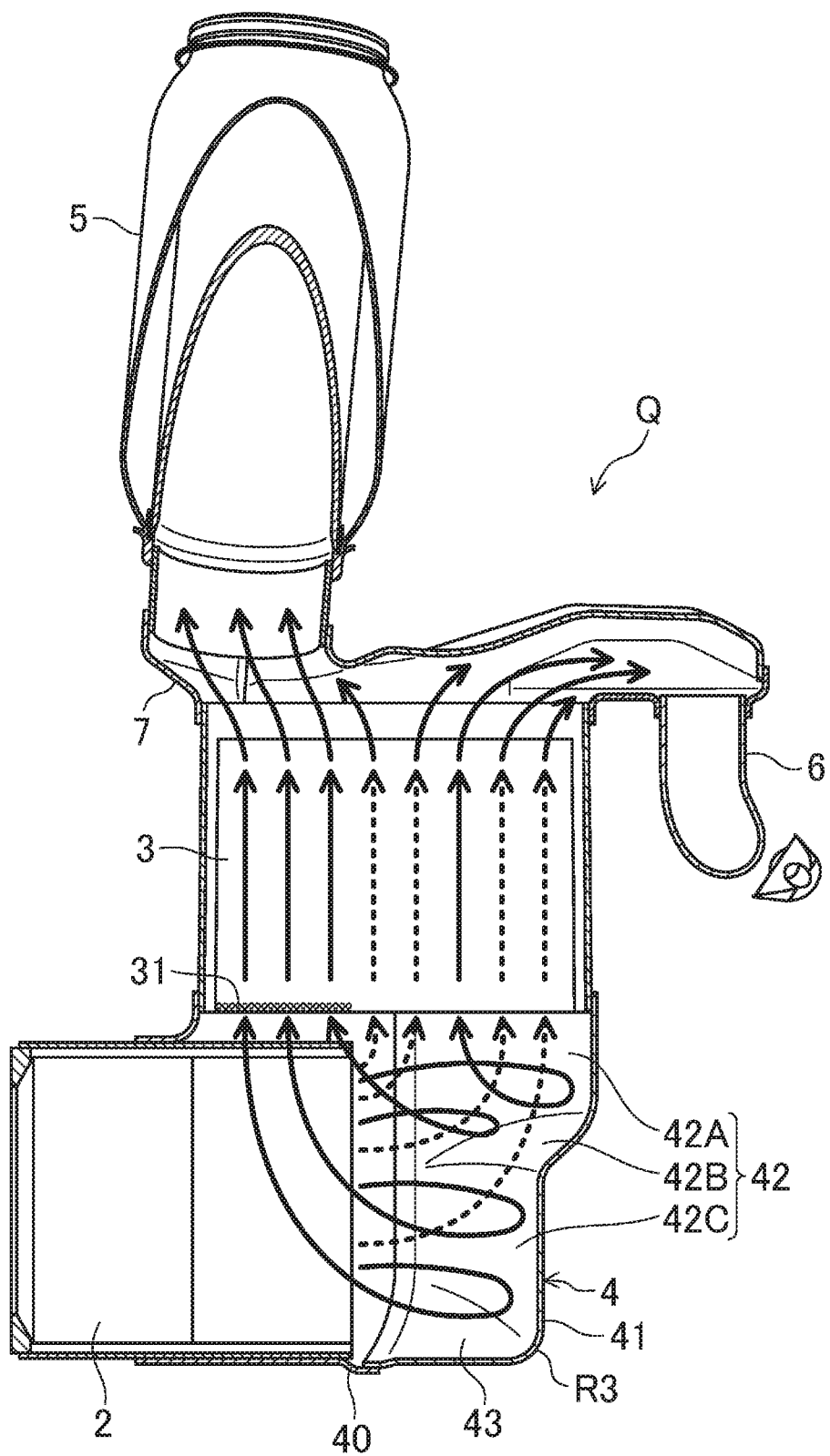
FIG. 6 schematically shows the flow of exhaust gas in FIG. 5.
Figure 11:
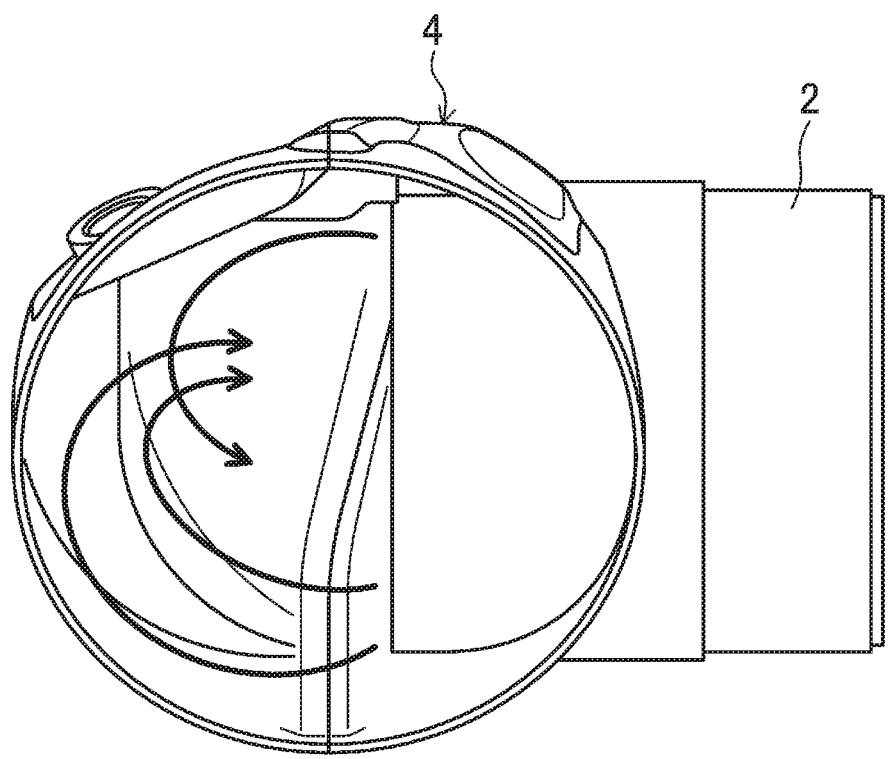
FIG. 11 schematically shows the flow of the exhaust gas in FIG. 10.

On the other hand, in the exhaust gas purifier 1 according to this embodiment, the first and second walls 42 and 43 are formed as follows. As shown in FIGS. 5 and 6, the second wall has a small curvature radius R3. As shown in FIGS. 10 and 11, the curvature radius R of the first wall is greater than the curvature radius R3 of the second wall. As shown in FIG. 9, the central axis L2 of the three-way catalyst 3 is shifted downward from the plane PL32, which includes the central axis L3 of the GPF 3 and is parallel to the central axis L2 of the three-way catalyst 2.

Then, as shown in FIG. 6, there is a change in the flow of exhaust gas. That is, the tendency increases that the exhaust gas, which has passed through the three-way catalyst 2, flows more along the surface of the first wall 42 than along the surface of the connector between the first wall 42 and the second wall 43. Specifically, as indicated by the broken arrow in FIG. 6, the flow of exhaust gas similar to the flow shown in FIG. 15 decreases. On the other hand, as indicated by the solid-line arrow in FIG. 6, an increasing flow of exhaust gas reaches the first wall 42, and flows along the surface of the curve of the wall transition 42A curving with the curvature radius R1 or of the wall step 42C curving with the curvature radius R2. As described above, as shown in FIG. 9, the central axis L2 of the three-way catalyst is shifted downward from the plane PL32, which is parallel to the central axis L2. Thus, the flow of exhaust gas increases, which flows along the wall transition curve or the wall step curve and winds upward from below. In this manner, the secondary flow of exhaust gas, which reaches the first wall 42 and winds up into the space between the three-way catalyst 2 and the GPF 3 is utilized. Then, the flow rate of the whole exhaust gas decreases so that the exhaust gas is diffused into the connecting pipe 4. This increases the amount of exhaust gas flowing into the overlap 31 of the GPF 3. This also decreases the flow resistance of the exhaust gas flowing into the GPF 3, thereby providing a uniform flow of exhaust gas. This can improve utilization efficiency, function, and performance of the GPF 3.

The wall step 42C of the first wall 42, which is continuous with the second wall 43, protrudes more toward the three-way catalyst 2 than the wall transition 42A. As shown in FIG. 6, this reduces the concentrated flow of exhaust gas, which has passed through the three-way catalyst 2 and reaches the wall step 42C, toward the end of the GPF 3, at which the wall transition 42A exists. This also promotes the flow of exhaust gas to the overlap 31.

As shown in FIG. 10, the curvature radius R1 of the wall transition is set to be greater than the curvature radius R2 of the wall step.

It is considered, as indicated by the solid arrow in FIGS. 7, 8, and 11, that the exhaust gas, which has passed through the three-way catalyst 2, reaches the first wall 42, particularly, the wall transition 42A or the wall step 42C, and winds up or winds down along the curved surface of the wall transition 42A or the wall step 42C to be diffused into the bend 4C of the connecting pipe 4. At this time, as shown in FIGS. 7 and 8, the curvature radius R1 of the wall transition is greater than the curvature radius R2 of the wall step, that is, the wall transition 42A curves more gently than the wall step 42C. This further reduces the flow rate of exhaust gas near the upstream end surface 3A of the GPF 3. Accordingly, the flow resistance of the exhaust gas flowing into the GPF 3 from the connecting pipe 4 further decreases, and a uniform flow of exhaust gas is provided. This can further improve utilization efficiency, function, and performance of the GPF 3.

As shown in FIG. 8, a base 44 is provided on the top 4D of the connecting pipe 4 and on the second connecting member 41. Control devices such as various sensors including an $NO_x$ sensor (detecting means) 92 shown in FIG. 4 are mounted on the base 44. In FIG. 8, for simplicity, the sensor body of the $NO_x$ sensor 92 is not shown, and only a mount 92A for $NO_x$ sensor for mounting the sensor body is shown.

As described above, the exhaust gas, which has passed through the three-way catalyst 2, is diffused into the connecting pipe 4 and then flows into the GPF 3. At this time, little of the exhaust gas, which has passed through the three-way catalyst 2, directly reaches the top 4D of the connecting pipe 4. At the top 4D, the secondary flow of exhaust gas, which winds up along the surface of the first wall 42, diffuses the exhaust gas. Then, near the top 4D of the connecting pipe 4, a sufficient amount of exhaust gas for detecting, for example, the component concentration, temperature, and pressure of the exhaust gas is diffused at a lower flow rate. This arrangement of various sensors near the top 4D of the connecting pipe 4 achieves stable detection accuracy, and improves the mountability of control devices such as various sensors.

Although the base 44 is flat as shown in FIG. 8, note that the shape is not limited thereto. The base 44 may have, for example, a curved surface. Further, the control devices such as various sensors may be provided in a position other than the base 44.

<Downstream End of GPF>

Figure 13:
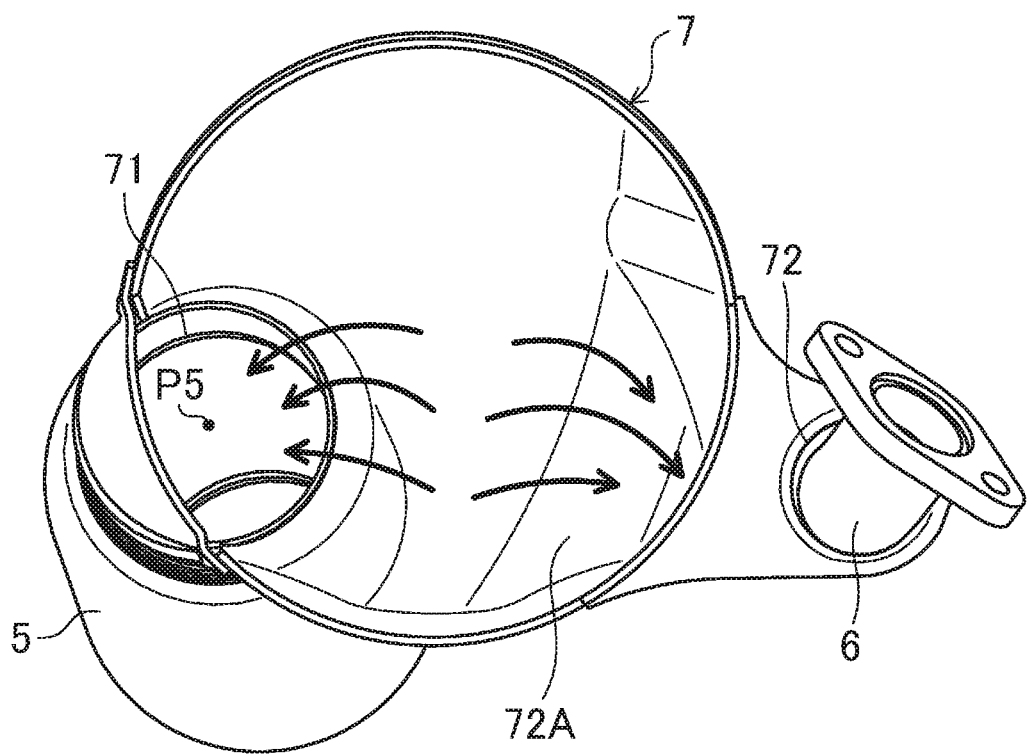
FIG. 13 shows a downstream end part of an EGR when viewed from the front.

As shown in FIG. 3, a downstream end part 7 of the GPF is connected to the downstream end of the GPF 3. As shown in FIG. 13, the downstream end part 7 of the GPF is provided with an introduction hole 71 for the exhaust gas outlet, and an introduction port 72 for the EGR. The introduction hole 71 allows for attachment of the exhaust gas outlet 5 that is the outlet of the exhaust gas, which has passed through the GPF 3. The introduction port 72 allows for attachment of the outlet 6 for the EGR that feeds part of the exhaust gas to the intake side.

<Exhaust Gas Outlet>

The exhaust gas outlet 5 is for guiding the exhaust gas, which has passed through the GPF 3, to the downstream exhaust gas passage (not shown). The exhaust gas outlet 5 is also for collecting and removing the moisture generated at the purification of the exhaust gas using the three-way catalyst 2 and the GPF 3.

The line denoted by the reference character PRL31 shown in FIG. 5 is a projection line of the central axis L3 of the GPF on the V-V cross-section. On the other hand, the line denoted by the reference character L5 represents the central axis of the exhaust gas outlet 5. The point denoted by the reference character P5 is located on the central axis L5 of the exhaust gas outlet. The point P5 represents the intersection between the central axis L5 and a plane including the introduction hole 71 for the exhaust gas outlet, which is shown in FIG. 13 and will be described later. That is, the point P5 represents the center of the introduction hole 71 for the exhaust gas outlet, and is hereinafter referred to as the center position P5 of the exhaust gas outlet 5.

As shown in FIG. 5, the center position P5 of the exhaust gas outlet 5, which is close to the downstream end surface 3B of the GPF 3, is offset to the right, that is toward the three-way catalyst 2, from the projection line PRL31 of the central axis L3 of the GPF 3 on the V-V cross-section.

As shown in FIGS. 6 and 13, this configuration causes a flow of the exhaust gas, which has flowed into the GPF 3, toward the exhaust gas outlet 5. Then, with the flow of the exhaust gas toward the exhaust gas outlet 5, an increasing amount of the exhaust gas flows into the overlap 31. This can improve the utilization efficiency of the GPF 3.

As shown in FIG. 5, the degree of the offset of the exhaust gas outlet 5 is set as follows in one preferred embodiment in order to obtain a sufficient amount of exhaust gas flowing into the overlap 31 to improve the utilization efficiency of the GPF 3. On the V-V cross-section, the right side surface 5A of the exhaust gas outlet 5, which is closer to the three-way catalyst 2, is located on the right of the side surface 3C of the GPF 3, which is closer to the three-way catalyst 2, that is, located closer to the three-way catalyst 2. At this time, the degree of the offset of the exhaust gas outlet 5 is set as follows in one preferred embodiment in order to reduce an increase in the flow resistance around the exhaust gas outlet 5. On the V-V cross-section, the left side surface 5B of the exhaust gas outlet 5 is located on the left of the side surface 3C of the GPF 3, which is closer to the three-way catalyst 2.

As shown in FIG. 9, the exhaust gas outlet 5 is placed below the plane PL32. This placement of the exhaust gas outlet 5 below the GPF 3 allows for effective collection and removal of the moisture generated at the purification of the exhaust gas using the three-way catalyst 2 and the GPF 3 at the exhaust gas outlet 5.

<Outlet for EGR>

The engine E may employ, as a component, an EGR that recirculates part of exhaust gas to an intake side, for the purpose of preventing or reducing knocking and reducing the amount of nitrogen oxide NOR. In this case, the exhaust gas outlet 6 for the EGR may be provided near the downstream end surface 3B of the GPF 3.

As shown in FIG. 5, the outlet 6 for the EGR is placed opposite to the exhaust gas outlet 5 with respect to the projection line PRL31 of the central axis L3 of the GPF 3 on the V-V cross section. As shown in FIG. 13, the downstream end part 7 of the GPF is provided with an exhaust gas guiding passage 72A for the EGR in a position apart from the introduction hole 71 for the exhaust gas outlet. The exhaust gas guiding passage 72A allows for guiding of the exhaust gas to the introduction port 72 for the EGR.

This configuration maintains a sufficient amount of exhaust gas for the EGR and diffuses the flow of exhaust gas within the GPF 3 into the exhaust gas outlet 5 and the outlet 6 for the EGR to provide a uniform flow of exhaust gas. This can further improve utilization efficiency, function, and performance of the GPF 3.

<In-Vehicle Layout>

Figure 14:
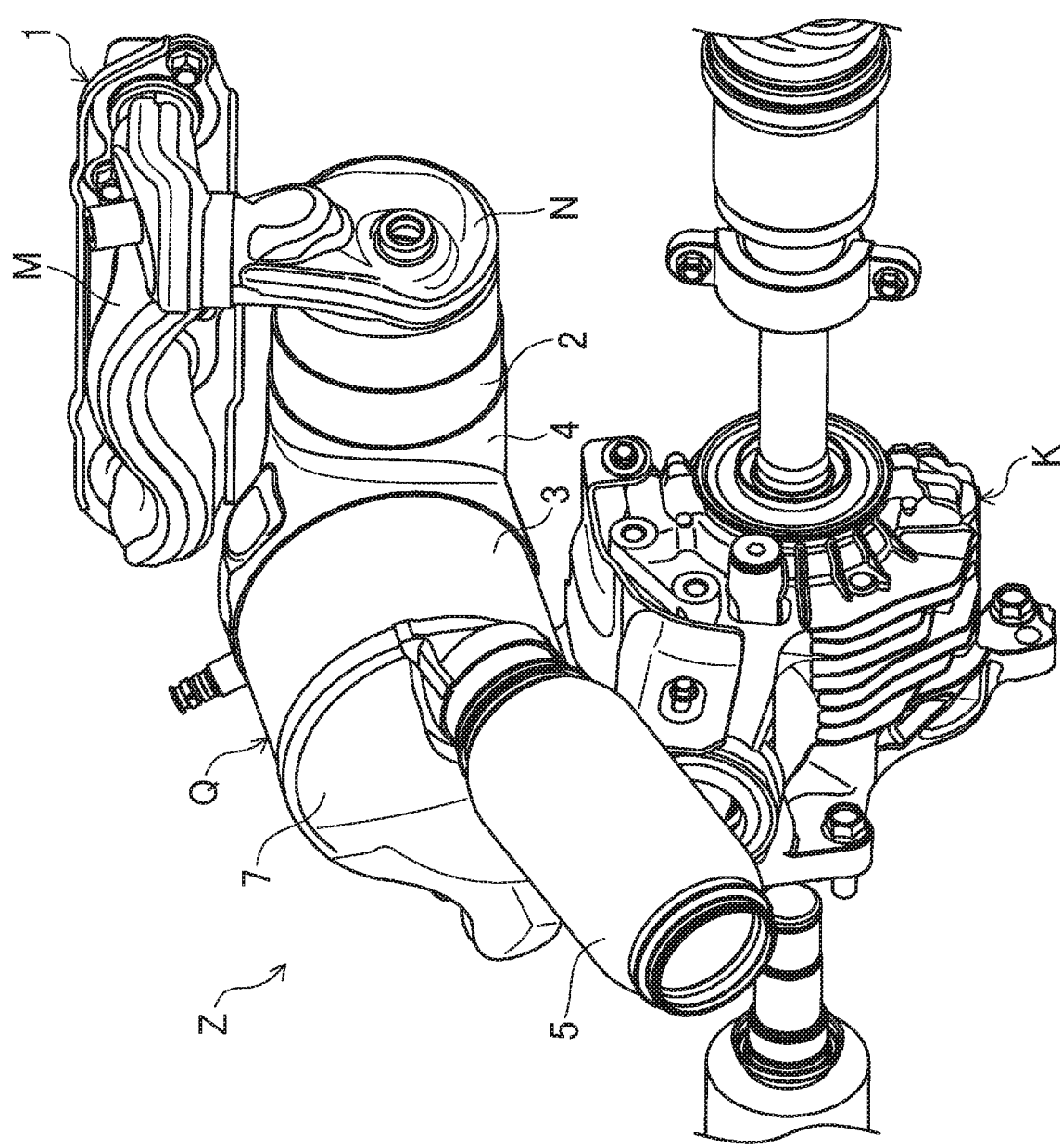
FIG. 14 is a perspective view showing a layout configuration of the exhaust gas purifier according to the first embodiment.

The exhaust gas purifier 1 according to this embodiment may be assembled into, for example, the structure of a vehicle layout Z as shown in FIG. 14.

Specifically, as shown in FIG. 9, the three-way catalyst 2 is provided slightly lower than the GPF 3. Accordingly, as shown in FIG. 14, placement of the exhaust manifold M above and close to the three-way catalyst 2 further downsizes the exhaust gas purifier 1 particularly in the longitudinal direction.

As shown in FIGS. 1 and 3, the bottom 4E of the connecting pipe 4 and the bottom 3D of the GPF 3 are formed linearly. As a result, as shown in FIG. 14, a power divider (vehicle component) K is placed below and close to the connecting pipe 4 and the GPF 3. This placement achieves a more compact vehicle layout in the longitudinal, lateral, and vertical directions.

Note that the vehicle component placed below the connecting pipe 4 and the GPF 3 is not limited to the power divider K, and may be any other vehicle component. Specifically, for example, if a drive shaft of a drive system or the exhaust gas purifier 1 is applied to, for example, an FR vehicle; for example, an engine mount of a mount system may be placed close to the connecting pipe 4 and the GPF 3.

Other Embodiments

Now, other embodiments of the present disclosure will be described in detail. In the following description, the same reference characters as those in the first embodiment are used to represent equivalent elements, and the detailed explanation thereof will be omitted.

Although being applied to the FF vehicle, the exhaust gas purifier 1 of the first embodiment is also applicable to an FR vehicle with the following configuration. The independent exhaust pipes of the exhaust manifold M, which are connected to the four exhaust ports, extend rearward and merge to be oriented at the rear end of the engine E toward the center of the vehicle width, and then further extend rearward.

In the first embodiment, the three-way catalyst 2 serves as the first catalyst, and the GPF 3 serves as the second catalyst. However, the catalysts are not limited thereto, and various catalysts may be used. Specifically, for example, if the exhaust gas purifier 1 is applied to a diesel engine, a diesel particulate filter may be employed. To serve as the first catalyst and the second catalyst, an oxidation catalyst and a catalyst for $NO_x$ purification may be combined.

In the first embodiment, as shown in FIG. 9, the three-way catalyst 2 is provided slightly below the GPF 3. As shown in FIG. 10, the wall transition 42A and the wall step 42C of the first wall 42 include the wall transition curve, which curves with the curvature radius R1, and the wall step curve, which curves with the curvature radius R2, respectively, toward the bottom 4E of the connecting pipe 4. In this respect, the three-way catalyst 2 may be provided at a level higher than or equal to that of the GPF 3. The wall transition 42A and the wall step 42C of the first wall 42 may include, in a position closer to the top 4D of the connecting pipe 4, the wall transition curve, which curves with the curvature radius R1, and the wall step curve, which curves with the curvature radius R2, respectively. Alternatively, the wall transition curve and the wall step curve may be provided in each of the positions closer to the top 4D and the bottom 4E of the connecting pipe 4. Instead of the curved shape, a gentle slope such as the base 44 may be provided. In this case, the secondary flow of exhaust gas may be formed along the slope. In any case, the position for mounting the detecting means, such as the base 44 for mounting the sensors, is not limited to the position closer to the top 4D of the connecting pipe 4. The detecting means may be provided in a position, such as at the bottom 4E or the first connecting member 40, in which a uniform flow of exhaust gas is obtained.

In the first embodiment, the outlet of the exhaust manifold M is located on the right of the cylinder arrangement. As shown in FIG. 10, the connecting pipe 4 is configured so that the first opening 4A is located on the right, as viewed from the rear. In this respect, the first opening 4A may be arranged in any other position or direction such as the left or the vertical direction, depending on the vehicle layout.

In the first embodiment, the three-way catalyst 2 and the GPF 3 are inserted into the connecting pipe 4. However, these catalysts may be connected to the upstream and downstream ends of the connecting pipe 4, for example, via connecting flanges without being inserted into the connecting pipe 4. Alternatively, one of the three-way catalyst 2 and the GPF 3 may be inserted into the connecting pipe 4, and the other may be connected to an end of the connecting pipe 4, for example, via a connecting flange. Note that the configuration of the first embodiment may be employed in one preferred embodiment in order to downsize the exhaust gas purifier 1.

INDUSTRIAL APPLICABILITY

The present disclosure can provide a small-sized engine exhaust device capable of efficiently using catalysts to improve function and performance of the catalysts and to improve mountability of a control device. Therefore, the present disclosure is significantly useful.

DESCRIPTION OF REFERENCE CHARACTERS

1 Exhaust Gas Purifier (Engine Exhaust Device)
2 Three-Way Catalyst (First Catalyst)
2A Upstream End Surface of Three-Way Catalyst (Upstream End Surface of First Catalyst)
2B Downstream End Surface of Three-Way Catalyst (Downstream End Surface of First Catalyst)
3 Gasoline Particulate Filter, GPF (Second Catalyst)

3A Upstream End Surface of GPF (Upstream End Surface of Second Catalyst)
3B Downstream End Surface of GPF (Downstream End Surface of Second Catalyst)
3C Side Surface of GPF (Side Surface of Second Catalyst closer to First Catalyst)
3D Bottom of GPF (Bottom of Second Catalyst)
4 Connecting Pipe (Connecting Member)
4A First Opening
4B Second Opening
4C Bend
4D Top
4E Bottom
5 Exhaust Gas Outlet
5A Right Side Surface of Exhaust Gas Outlet
5B Left Side Surface of Exhaust Gas Outlet
6 Outlet for EGR
7 Downstream End Part of GPF
21 Preceding Part
22 Succeeding Part
23 Catalyst Mat
24 Catalyst Case
31 Overlap
40 First Connecting Member
40A First Joint
41 Second Connecting Member
42 First Wall
42A Wall Transition
42B Wall Slope
42C Wall Step
43 Second Wall
44 Base
45 Support
45A Support adjacent to First Opening
45B Support (Support Surface) adjacent to Downstream End Surface of Three-Way Catalyst
71 Introduction Hole for Exhaust Gas Outlet
72 Introduction Port for EGR
72A Exhaust Gas Guiding Passage for EGR
92 $NO_x$ Sensor (Detecting Means)
92A Mount for $NO_x$ Sensor
E Engine
K Power Divider (Vehicle Component)
L2 Central Axis of Three-Way Catalyst (Central Axis of First Catalyst)
L3 Central Axis of GPF (Central Axis of Second Catalyst)
L5 Central Axis of Exhaust Gas Outlet
M Exhaust Manifold
N Connector
P5 Center Position
PRL31 Projection Line
PL32 Plane
Q Catalyst Device
R Curvature Radius of First Wall
R1 Curvature Radius of Wall Transition
R2 Curvature Radius of Wall Step
R3 Curvature Radius of Second Wall (Predetermined Curvature Radius)
α Dihedral Angle
θ Angle

The invention claimed is:

1. An engine exhaust device, comprising:
a first catalyst disposed in an exhaust passage of an engine to purify exhaust gas discharged from the engine;
a second catalyst disposed downstream of the first catalyst in a direction of a flow of the exhaust gas to purify the exhaust gas that has passed through the first catalyst; and
a tubular connecting member forming a part of the exhaust passage, and connecting the first catalyst to the second catalyst, wherein
the connecting member includes:
a first opening located upstream in the flow of the exhaust gas;
a second opening located downstream in the flow of the exhaust gas; and
a bend connecting the first opening to the second opening,
a downstream end surface of the first catalyst is connected to the first opening,
an upstream end surface of the second catalyst is connected to the second opening,
the downstream end surface of the first catalyst and the upstream end surface of the second catalyst form a dihedral angle within a range from 60 to 120 degrees,
a part of the upstream end surface of the second catalyst includes an overlap that is close and opposed to a part of a surface of the first catalyst,
the bend of the connecting member includes:
a first wall opposed to the downstream end surface of the first catalyst; and
a second wall opposed to the upstream end surface of the second catalyst;
the first wall is connected to the second wall with a predetermined curvature radius,
the first wall has a curve curving with a curvature radius from at least one of a top and bottom of the connecting member along an outer periphery of the second catalyst, when viewed from the second opening with the first opening arranged on a right side or a left side,
the first wall being configured to direct the exhaust gas along an inner radial surface portion of the first wall, and
the curvature radius of the first wall is greater than the predetermined curvature radius.

2. The device of claim 1, wherein
the first catalyst is inserted into the connecting member from the downstream end surface of the first catalyst through the first opening, and
the second catalyst is inserted into the connecting member from the upstream end surface of the second catalyst through the second opening.

3. The device of claim 2, wherein
a central axis of the first catalyst is located below a plane which includes a central axis of the second catalyst and is parallel to the central axis of the first catalyst, and
the curve is formed near a bottom of the connecting member.

4. The device of claim 3, further comprising:
an exhaust manifold disposed above and close to the first catalyst, wherein
the bottom of the connecting member and a bottom of the second catalyst are formed linearly so that a vehicle component is placed below and close to the bottom of the connecting member and the bottom of the second catalyst.

5. The device of claim 3, wherein
a base for mounting a $NO_x$ sensor is provided on a top of the connecting member.

6. The device of claim 1, wherein
the connecting member includes:
- a first connecting member provided with the first opening and a part of the second opening; and
- a second connecting member provided with the other part of the second opening, wherein the first wall and the second wall are provided in the second connecting member.

7. The device of claim 4, wherein
a base for mounting a $NO_x$ sensor is provided on a top of the connecting member.

8. The device of claim 2, wherein
the connecting member includes:
- a first connecting member provided with the first opening and a part of the second opening; and
- a second connecting member provided with the other part of the second opening, wherein the first wall and the second wall are provided in the second connecting member.

9. The device of claim 3, wherein
the connecting member includes:
- a first connecting member provided with the first opening and a part of the second opening; and
- a second connecting member provided with the other part of the second opening, wherein the first wall and the second wall are provided in the second connecting member.

10. The device of claim 4, wherein
the connecting member includes:
- a first connecting member provided with the first opening and a part of the second opening; and
- a second connecting member provided with the other part of the second opening, wherein the first wall and the second wall are provided in the second connecting member.

11. The device of claim 5, wherein
the connecting member includes:
- a first connecting member provided with the first opening and a part of the second opening; and
- a second connecting member provided with the other part of the second opening, wherein the first wall and the second wall are provided in the second connecting member.

12. The device of claim 1, wherein
the first wall includes a wall transition, a wall slope, and a wall step, the wall transition extends forward from a downstream end where the second opening is formed,
the wall slope is connected to the wall transition and extends toward the first catalyst,
the wall step has a rear portion connected to the wall slope and a front portion connected to the second wall,
the wall transition is part of the curve and has a curvature radius as the curvature radius of the first wall, and
the wall step is part of the curve and has a curvature radius as the curvature radius of the first wall.

13. The device of claim 12, wherein
the curvature radius of the wall transition is greater than the curvature radius of the wall step.

14. The device of claim 1, wherein
the curve generates a flow of the exhaust gas that reaches the first wall and winds up into a space between the first catalyst and the second catalyst.

* * * * *